US011681033B2

United States Patent
Wang et al.

(10) Patent No.: US 11,681,033 B2
(45) Date of Patent: Jun. 20, 2023

(54) ENHANCED POLARIZED LIGHT COLLECTION IN COAXIAL LIDAR ARCHITECTURE

(71) Applicant: Beijing Voyager Technology Co., Ltd., Beijing (CN)

(72) Inventors: Youmin Wang, Mountain View, CA (US); Yonghong Guo, Mountain View, CA (US); Yue Lu, Mountain View, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 305 days.

(21) Appl. No.: 16/869,406

(22) Filed: May 7, 2020

(65) Prior Publication Data
US 2021/0349196 A1 Nov. 11, 2021

(51) Int. Cl.
*G01S 7/499* (2006.01)
*G01S 7/481* (2006.01)
(Continued)

(52) U.S. Cl.
CPC ............ *G01S 7/499* (2013.01); *G01S 7/4816* (2013.01); *G01S 17/931* (2020.01);
(Continued)

(58) Field of Classification Search
CPC ...... G01S 7/499; G01S 17/931; G01S 7/4816; G02B 27/283; G02F 1/0136; G02F 1/09
See application file for complete search history.

(56) References Cited

U.S. PATENT DOCUMENTS

| | | | | |
|---|---|---|---|---|
| 5,974,205 A | * | 10/1999 | Chang | G02B 27/283 385/11 |
| 2009/0231704 A1 | * | 9/2009 | Chen | G02B 27/283 359/489.08 |

(Continued)

FOREIGN PATENT DOCUMENTS

| | | | | |
|---|---|---|---|---|
| EP | 2388615 A1 | 11/2011 | | |
| EP | 2659222 B1 | * 11/2020 | ......... | G01B 9/02004 |

(Continued)

OTHER PUBLICATIONS

PCT/US2021/030503, "International Preliminary Report on Patentability", dated Nov. 17, 2022, 8 pages.
PCT/US2021/030503, "International Search Report and Written Opinion", dated Aug. 20, 2021, 11 pages.

*Primary Examiner* — Jamil Ahmed
(74) *Attorney, Agent, or Firm* — Kilpatrick Townsend & Stockton LLP

(57) ABSTRACT

Disclosed herein are techniques for improving the light collection efficiency in coaxial LiDAR systems. A coaxial LiDAR system includes a photodetector, a first polarization beam splitter configured to receive a returned light beam including a first linear polarization component and a second linear polarization component and direct the different linear polarization components to different respective directions, a polarization beam combiner configured to transmit the first linear polarization component from the first polarization beam splitter to the photodetector, a non-reciprocal polarization rotator configured to transmit the second linear polarization component from the first polarization beam splitter, and a second polarization beam splitter configured to reflect the second linear polarization component from the non-reciprocal polarization rotator towards the polarization beam combiner. The polarization beam combiner is further configured to reflect the second linear polarization compo- (Continued)

nent from the second polarization beam splitter to the photodetector.

20 Claims, 13 Drawing Sheets

(51) Int. Cl.
  *G01S 17/931* (2020.01)
  *G02B 27/28* (2006.01)
  *G02F 1/01* (2006.01)
  *G02F 1/09* (2006.01)
(52) U.S. Cl.
  CPC ......... *G02B 27/283* (2013.01); *G02F 1/0136* (2013.01); *G02F 1/09* (2013.01)

(56) References Cited

U.S. PATENT DOCUMENTS

| | | | |
|---|---|---|---|
| 2011/0080580 A1* | 4/2011 | Fermann | G01N 21/65 372/18 |
| 2012/0168650 A1* | 7/2012 | Flanders | G01B 9/02069 250/550 |
| 2015/0062555 A1 | 3/2015 | Kim | |
| 2018/0059223 A1 | 3/2018 | Jeong et al. | |

FOREIGN PATENT DOCUMENTS

| | | | | |
|---|---|---|---|---|
| KR | 20190017451 A | * | 2/2019 | ............. G01S 7/481 |
| WO | WO-2016018033 A1 | * | 2/2016 | ............. G02B 27/30 |

* cited by examiner

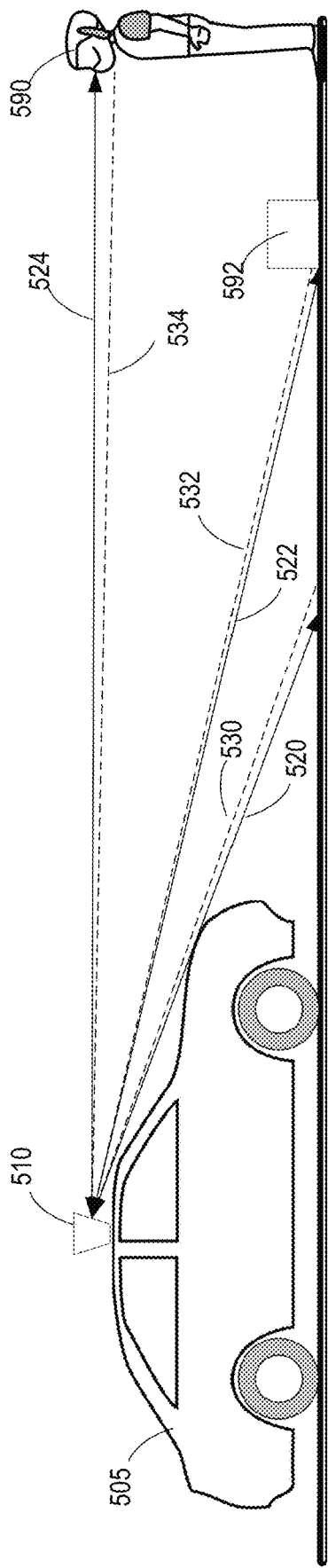
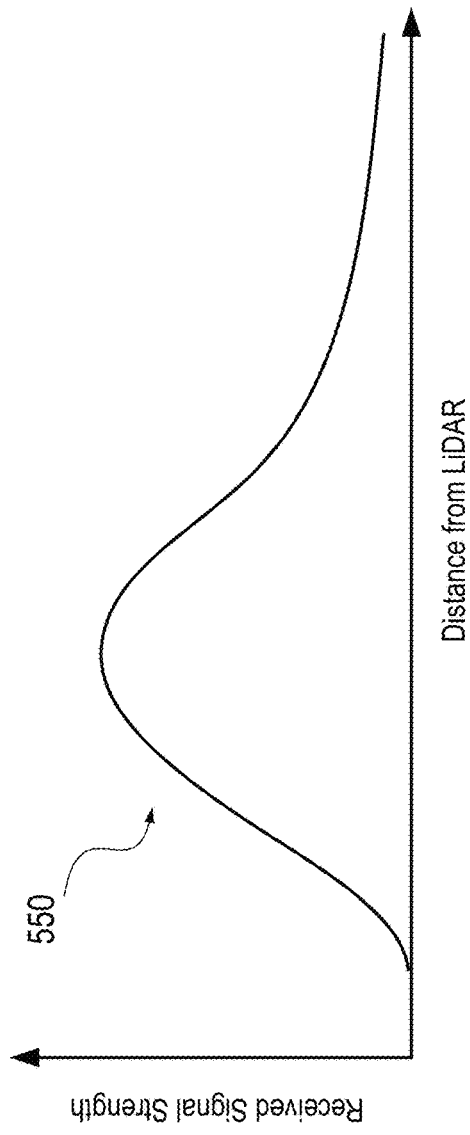
FIG. 5A
FIG. 5B

ENHANCED POLARIZED LIGHT COLLECTION IN COAXIAL LIDAR ARCHITECTURE

CROSS-REFERENCES TO RELATED APPLICATIONS

The following two U.S. patent applications listed below (which include the present application) are being filed concurrently, and the entire disclosure of the other application is hereby incorporated by reference into this application for all purposes:

application Ser. No. 16/869,403, filed May 7, 2020, and entitled "Hybrid Detectors For Various Detection Range In LiDAR"; and application Ser. No. 16/869,406, filed May 7, 2020, and entitled "Enhanced Polarized Light Collection In Coaxial LiDAR Architecture".

BACKGROUND

Modern vehicles are often equipped with sensors designed to detect objects and landscape features around the vehicle in real-time to enable technologies such as lane change assistance, collision avoidance, and autonomous driving. Some commonly used sensors include image sensors (e.g., infrared or visible light cameras), acoustic sensors (e.g., ultrasonic parking sensors), radio detection and ranging (RADAR) sensors, magnetometers (e.g., passive sensing of large ferrous objects, such as trucks, cars, or rail cars), and light detection and ranging (LiDAR) sensors.

A LiDAR system typically uses a light source and a light detection system to estimate distances to environmental features (e.g., pedestrians, vehicles, structures, plants, etc.). For example, a LiDAR system may transmit a light beam (e.g., a pulsed laser beam) to illuminate a target and measure the time it takes for the transmitted light beam to arrive at the target and then return to a receiver (e.g., a photodetector) near the transmitter or at a known location. In some LiDAR systems, the light beam emitted by the light source may be steered across a region of interest according to a scanning pattern to generate a "point cloud" that includes a collection of data points corresponding to target points in the region of interest. The data points in the point cloud may be dynamically and continuously updated, and may be used to estimate, for example, a distance, dimension, and location of an object relative to the LiDAR system.

LiDAR systems used in, for example, autonomous driving or driving assistance, often need to have both a high accuracy and a high sensitivity over a large range and field of view, for safety, user experience, and other reasons. For example, LiDAR systems that have both a high probability of detection and a low probability of false alarm are generally needed in vehicles, such as automobiles and aerial vehicles.

SUMMARY

Techniques disclosed herein relate generally to light detection and ranging (LiDAR) systems. More specifically, and without limitation, disclosed herein are techniques for improving the returned light collection efficiency in a coaxial LiDAR system to increase signal levels of signals of interest and thus the signal-to-noise ratio of the coaxial LiDAR system. Various inventive embodiments are described herein, including devices, units, subsystems, modules, systems, methods, and the like.

According to certain embodiments, a coaxial LiDAR system may include a photodetector, a first polarization beam splitter configured to receive a returned light beam including a first linear polarization component and a second linear polarization component and direct the first linear polarization component and the second linear polarization component to different respective directions, a polarization beam combiner configured to transmit the first linear polarization component from the first polarization beam splitter to the photodetector, a non-reciprocal polarization rotator configured to transmit the second linear polarization component from the first polarization beam splitter, and a second polarization beam splitter configured to reflect the second linear polarization component from the non-reciprocal polarization rotator towards the polarization beam combiner. The polarization beam combiner may also be configured to reflect the second linear polarization component from the second polarization beam splitter to the photodetector.

In some embodiments of the coaxial LiDAR system, the non-reciprocal polarization rotator may include a Faraday rotator configured to rotate a polarization direction of a linearly polarized light beam by 45° and a half-wave plate. The Faraday rotator and the half-wave plate are arranged such that the non-reciprocal polarization rotator is configured to rotate the polarization direction of the linearly polarized light beam propagating in a first direction by 90°, and rotate the polarization direction of the linearly polarized light beam propagating in a second direction opposite the first direction by 0°.

In some embodiments, the coaxial LiDAR system may include a light source configured to emit a linearly polarized scanning beam that includes the first linear polarization component, and may also include an optical scanner. The second polarization beam splitter may further be configured to transmit the first linear polarization component of the linearly polarized scanning beam from the light source to the non-reciprocal polarization rotator. The non-reciprocal polarization rotator may further be configured to convert the first linear polarization component of the linearly polarized scanning beam to the second linear polarization component by rotating a polarization direction of the linearly polarized scanning beam by 90°. The first polarization beam splitter may further be configured to reflect the linearly polarized scanning beam having the second linear polarization component to the optical scanner.

In some embodiments, the first polarization beam splitter, the polarization beam combiner, and the second polarization beam splitter may include polarization beam splitter cubes. The photodetector may include at least one of a PIN photodetector, an avalanche photodiode, a single-photon avalanche photodiode, a silicon photomultiplier sensor, a multi-pixel photon counter, or a photomultiplier tube. In some embodiments, the first linear polarization component may include a p-wave, and the second linear polarization component may include an s-wave.

In some embodiments, the coaxial LiDAR system may also include at least one of a light filter or a lens between the polarization beam combiner and the photodetector. In some embodiments, the coaxial LiDAR system may also include at least one of a mirror or a prism reflector, where the at least one of the mirror or the prism reflector may be configured to direct the second linear polarization component from the non-reciprocal polarization rotator to the polarization beam combiner.

According to certain embodiments, a coaxial LiDAR system may include a photodetector; a polarization beam splitter configured to receive a returned light beam including a first linear polarization component and a second linear polarization component and direct the first linear polarization component and the second linear polarization component to different respective directions; a polarization beam combiner configured to transmit the first linear polarization component from the polarization beam splitter to the photodetector; a non-reciprocal polarization rotator configured to receive the second linear polarization component from the polarization beam splitter and convert the second linear polarization component to the first linear polarization component; a birefringent device configured to receive the first linear polarization component from the non-reciprocal polarization rotator and shift the first linear polarization component by a spatial walk-off distance; one or more reflectors configured to direct the first linear polarization component from the birefringent device towards the polarization beam combiner; and a polarization rotator configured to convert the first linear polarization component to the second linear polarization component. The polarization rotator may be between the birefringent device and the one or more reflectors, between the one or more reflectors, or between the polarization beam combiner and the one or more reflectors. The polarization beam combiner may further be configured to reflect the second linear polarization component from the polarization rotator to the photodetector.

In some embodiments of the coaxial LiDAR system, the non-reciprocal polarization rotator may include a Faraday rotator configured to rotate a polarization direction of a linearly polarized light beam by 45°, and a half-wave plate. The Faraday rotator and the half-wave plate may be arranged such that the non-reciprocal polarization rotator is configured to rotate the polarization direction of the linearly polarized light beam propagating in a first direction by 90°, and rotate the polarization direction of the linearly polarized light beam propagating in a second direction opposite the first direction by 0°.

In some embodiments, the polarization beam splitter and the polarization beam combiner may include polarization beam splitter cubes. In some embodiments, the first linear polarization component may include an e-ray, and the second linear polarization component may include an o-ray. The one or more reflectors may include at least one of a mirror or a prism reflector.

In some embodiments, the coaxial LiDAR system may also include a light source configured to emit a linearly polarized scanning beam including the second linear polarization component, and an optical scanner. The birefringent device may further be configured to transmit, with no spatial walk-off, the second linear polarization component of the linearly polarized scanning beam from the light source to the non-reciprocal polarization rotator. The non-reciprocal polarization rotator may further be configured to transmit the second linear polarization component of the linearly polarized scanning beam from the birefringent device to the polarization beam splitter. The polarization beam splitter may further be configured to reflect the linearly polarized scanning beam having the second linear polarization component to the optical scanner. In some embodiments, the coaxial LiDAR system may also include at least one of a light filter or a lens between the polarization beam combiner and the photodetector.

According to certain embodiments, a coaxial LiDAR system may include a photodetector; a first polarization beam splitter configured to receive a returned light beam including a first linear polarization component and a second linear polarization component and direct the first linear polarization component and the second linear polarization component to different respective directions; a polarization rotator configured to receive the first linear polarization component from the first polarization beam splitter and convert the first linear polarization component to the second linear polarization component; a polarization beam combiner configured to transmit the second linear polarization component from the polarization rotator to the photodetector; a non-reciprocal polarization rotator configured to receive the second linear polarization component from the first polarization beam splitter and convert the second linear polarization component to the first linear polarization component, and a second polarization beam splitter configured to reflect the first linear polarization component from the non-reciprocal polarization rotator towards the polarization beam combiner. The polarization beam combiner may further be configured to reflect the first linear polarization component from the second polarization beam splitter to the photodetector.

In some embodiments of the coaxial LiDAR system, the first linear polarization component may include an s-wave, and the second linear polarization component may include a p-wave. In some embodiments, the first polarization beam splitter, the polarization beam combiner, and the second polarization beam splitter may include polarization beam splitter cubes. In some embodiments, the non-reciprocal polarization rotator may include a Faraday rotator configured to rotate a polarization direction of a linearly polarized light beam by 45°, and a half-wave plate. The Faraday rotator and the half-wave plate may be arranged such that the non-reciprocal polarization rotator may be configured to rotate the polarization direction of the linearly polarized light beam propagating in a first direction by 90°, and rotate the polarization direction of the linearly polarized light beam propagating in a second direction opposite the first direction by 0°.

In some embodiments, the coaxial LiDAR system may further include a light source configured to emit a linearly polarized scanning beam including the second linear polarization component, and an optical scanner. The second polarization beam splitter may further be configured to transmit the second linear polarization component of the linearly polarized scanning beam from the light source to the non-reciprocal polarization rotator. The non-reciprocal polarization rotator may further be configured to transmit the linearly polarized scanning beam having the second linear polarization component from the second polarization beam splitter to the first polarization beam splitter. The first polarization beam splitter may further be configured to transmit the linearly polarized scanning beam having the second linear polarization component to the optical scanner.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

Aspects and features of the various embodiments will be more apparent by describing examples with reference to the accompanying drawings, in which like reference numerals refer to like components or parts throughout the drawings.

FIG. 3A illustrates an example of a beam steering operation by the LiDAR system according to certain embodiments. FIG. 3B illustrates an example of a returned beam detection operation by the LiDAR system according to certain embodiments.

FIG. 5A illustrates an example of a LiDAR system for detecting objects in different distance ranges. FIG. 5B illustrates an example of a relation between the received signal strength and the object distance for an example of a LiDAR system.

DETAILED DESCRIPTION

Figure 1:
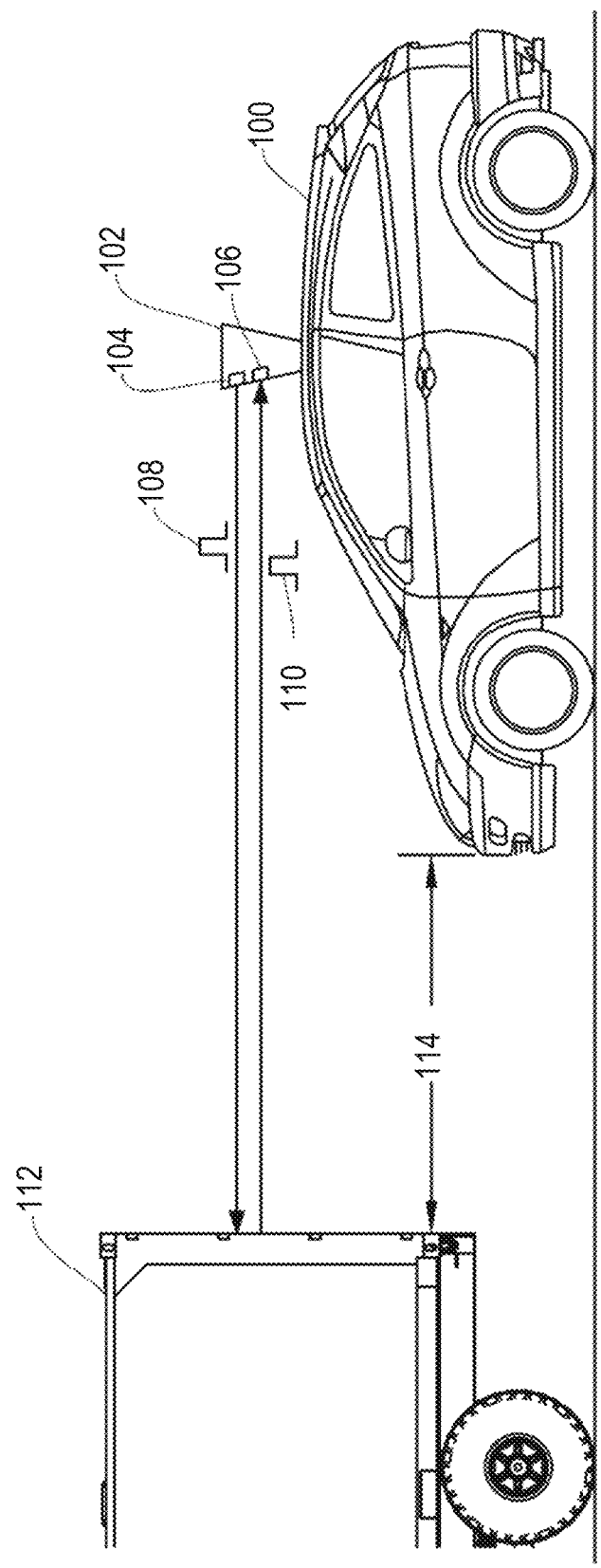
FIG. 1 illustrates an example of a vehicle including a light detection and ranging (LiDAR) system according to certain embodiments.

Techniques disclosed herein relate generally to light detection and ranging (LiDAR) systems. More specifically, disclosed herein are techniques for improving the returned light collection efficiency in a coaxial LiDAR system to, thereby increasing the signal levels of signals of interest and thus the signal-to-noise ratio of the coaxial LiDAR system. Various inventive embodiments are described herein, including devices, systems, circuits, methods, code, or instructions executable by one or more processors, and the like.

A LiDAR system may include a transmitter subsystem that transmits pulsed light beams (e.g., infrared light beam), and a receiver subsystem that receives the returned pulsed light beam and detects objects (e.g., people, animals, and automobiles) and environmental features (e.g., trees and building structures). A LiDAR system carried by a vehicle (e.g., an automobile or an unmanned aerial vehicle) may be used to determine the vehicle's relative position, speed, and direction with respect to other objects or environmental features, and thus may, in some cases, be used for autonomous driving, auto-piloting, driving assistance, parking assistance, collision avoidance, and the like. It may be desirable for a LiDAR system to maintain both a high accuracy (e.g., a low probability of false alarm) and a high sensitivity (e.g., a high probability of detection) for a wide detection range (e.g., from about 1 meter to about 200 or 300 meters).

A coaxial LiDAR system may generally include a laser source, a beam scanner or scanner system, a photodetector, and other optical components. The outgoing light emitted by the laser source may be linearly polarized or may be polarized by a linear polarizer. The returned light bounced back from the far field may include randomized polarization components. Because the system is co-axial, the returned light may overlap with the outgoing light and thus may need to be separated from the outgoing light emitted from the laser source, such that the returned light may be directed to the photodetector for detection. In some systems, a polarization beam splitter (PBS) may be used to separate the outgoing light and the returned light, where the polarization component of the returned light that has a polarization state orthogonal to the polarization state of the outgoing light may be transmitted or reflected by the PBS to reach the photodetector that is separate from the light source. The polarization component of the returned light that has a polarization state same as the polarization state of the outgoing light may be transmitted or reflected by the PBS towards the light source and thus may not reach the photodetector. Due to the random polarization of the returned light, only about 50% of the returned light may be collected by the photodetector, resulting in an about 50% loss of the returned light and an about 50% reduction of in the overall light collection efficiency. Thus, light sources with higher output power or photodetectors with higher sensitivity may be needed for the object detection, in particular, for long range detection.

According to certain embodiments, a non-reciprocal polarization rotator including a Faraday rotator may be used in a coaxial LiDAR system to achieve close to 100% light collection efficiency within the LiDAR system. The Faraday rotator is a directional (non-reciprocal) polarization optical element, and thus may be used with a reciprocal polarization optical component (e.g., a waveplate) to convert polarized light propagating in one direction from a first polarization state to a second orthogonal polarization state, while maintaining the polarization state of polarized light propagating in the opposite direction. Linearly polarized outgoing light from the light source may pass through the non-reciprocal polarization rotator and may be incident on an object. The returned light reflected or scattered by the object may be randomly polarized. The randomly polarized returned light may be separated by a first PBS into two portions having orthogonal polarization directions. A first portion of the two portions may propagate towards the photodetector, and the second portion may propagate towards the light source and pass through the non-reciprocal polarization rotator. Due to the opposite propagating directions within the Faraday rotator, the outgoing light reaching the non-reciprocal polarization rotator from the light source and the second portion of the returned light passing through the non-reciprocal polarization rotator may have different polarization states, and thus can be separated using, for example, a second polarization beam splitter or a birefringent device. The first portion and the second portion of the returned light may be combined by another PB S and may be directed to the photodetector. In this way, close to 100% of the returned light received by the LiDAR system may be directed to the photodetector to generate detection signals. Thus, the signal-to-noise ratio of the LiDAR system can be improved to achieve a high accuracy and a high sensitivity.

In the following description, for the purposes of explanation, specific details are set forth in order to provide a thorough understanding of examples of the disclosure. It will be apparent that various examples may be practiced without these specific details. The ensuing description provides examples only, and is not intended to limit the scope, applicability, or configuration of the disclosure. Rather, the ensuing description of the examples will provide those skilled in the art with an enabling description for implementing an example. It should be understood that various changes may be made in the function and arrangement of elements without departing from the spirit and scope of the disclosure as set forth in the appended claims. The figures and description are not intended to be restrictive. Circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples. The teachings disclosed herein can also be applied to various types of applications such as mobile applications, non-mobile application, desktop applications, web applications, enterprise applications, and the like. Further, the teachings of this disclosure are not restricted to a particular operating environment (e.g., operating systems, devices, platforms, and the like) but instead can be applied to multiple different operating environments.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Where components are described as being "configured to" perform certain operations, such configuration may be accomplished, for example, by designing electronic circuits or other hardware to perform the operation, by programming or controlling electronic circuits (e.g., microprocessors, or other suitable electronic circuits) to perform the operation, or any combination thereof.

The word "example" or "exemplary" is used herein to mean "serving as an example, instance, or illustration." Any embodiment or design described herein as "exemplary" or "example" is not necessarily to be construed as preferred or advantageous over other embodiments or designs.

A LiDAR system is an active remote sensing system that can be used to obtain the range from a transmitter to one or more points on a target in a field of view (FOV). A LiDAR system uses a light beam, typically a laser beam, to illuminate the one or more points on the target. Compared with other light sources, a laser beam may propagate over long distances without spreading significantly (highly collimated), and can be focused to small spots so as to deliver high optical power densities and provide fine resolution. The laser beam may be modulated such that the transmitted laser beam may include a series of pulses. The transmitted laser beam may be directed to a point on the target, which may then reflect or scatter the transmitted laser beam. The laser beam reflected or scattered from the point on the target back to the LiDAR system can be measured, and the time of flight (ToF) from the time a pulse of the transmitted light beam is transmitted from the transmitter to the time the pulse arrives at a receiver near the transmitter or at a known location may be measured. The range from the transmitter to the point on the target may then be determined by, for example, $r=c \times t/2$, where r is the range from the transmitter to the point on the target, c is the speed of light in free space, and t is the ToF of the pulse of the light beam from the transmitter to the receiver.

A LiDAR system may include, for example, a single-point scanning system or a single-pulse flash system. A single-point scanning system may use a scanner to direct a pulsed light beam (e.g., a pulsed laser beam) to a single point in the field of view at a time and measure the reflected or backscattered light beam with a photodetector. The scanner may then slightly tilt the pulsed light beam to illuminate the next point, and the process may be repeated to scan the full field of view. A flash LiDAR system, on the other hand, may transmit a wider-spread light beam and use a photodiode array (e.g., a focal-plane array (FPA)) to measure the reflected or backscattered light at several points simultaneously. Due to the wider beam spread, a flash LiDAR system may scan a field of view faster than a single-point scanning system, but may need a much more powerful light source to simultaneously illuminate a larger area.

FIG. 1 illustrates an example of a vehicle 100 including a LiDAR system 102 according to certain embodiments. LiDAR system 102 may allow vehicle 100 to perform object detection and ranging in the surrounding environment. Based on the result of the object detection and ranging, vehicle 100 may, for example, automatically maneuver (with little or no human intervention) to avoid a collision with an object in the environment. LiDAR system 102 may include a transmitter 104 and a receiver 106. In some embodiments, transmitter 104 and receiver 106 may share at least some optical components. For example, in a coaxial LiDAR system, the outgoing light from transmitter 104 and returned light to receiver 106 may be directed by a same scanning system and may at least partially overlap in space.

Transmitter 104 may direct one or more light pulses 108 (or a frequency modulated continuous wave (FMCW) light signal, an amplitude modulated continuous wave (AMCW) light signal, etc.), at various directions at different times according to a suitable scanning pattern. Receiver 106 may detect returned light pulses 110, which may be portions of transmitted light pulses 108 that are reflected or scattered by one or more areas on one or more objects. LiDAR system 102 may detect the object based on the detected light pulses 110, and may also determine a range (e.g., a distance) of each area on the detected objects based on a time difference between the transmission of a light pulse 108 and the reception of a corresponding light pulse 110, which is referred to as the time of flight. Each area on a detected object may be represented by a data point that is associated with a 2-D or 3-D direction and distance with respect to LiDAR system 102.

The above-described operations can be repeated rapidly for many different directions. For example, the light pulses can be scanned using various scanning mechanisms (e.g., spinning mirrors or MEMS devices) according to a one-dimensional or two-dimensional scan pattern for two-dimensional or three-dimensional detection and ranging. The collection of the data points in the 2-D or 3-D space may form a "point cloud," which may indicate, for example, the direction, distance, shape, and dimensions of a detected object relative to the LiDAR system.

In the example shown in FIG. 1, LiDAR system 102 may transmit light pulse 108 towards a field in front of vehicle 100 at time T1, and may receive, at time T2, a returned light pulse 110 that is reflected by an object 112 (e.g., another vehicle). Based on the detection of light pulse 110, LiDAR system 102 may determine that object 112 is in front of vehicle 100. In addition, based on the time difference between T1 and T2, LiDAR system 102 may determine a distance 114 between vehicle 100 and object 112. LiDAR system 102 may also determine other useful information, such as a relative speed and/or acceleration between two vehicles and/or the dimensions of the detected object (e.g., the width or height of the object), based on additional light pulses detected. As such, vehicle 100 may be able to adjust its speed (e.g., slowing down, accelerating, or stopping) to avoid collision with other objects, or may be able to control other systems (e.g., adaptive cruise control, emergency brake assist, anti-lock braking systems, or the like) based on the detection and ranging of objects by LiDAR system 102.

LiDAR systems may detect objects at distances ranging from a few meters to more than 200 meters. Because of its ability to collimate laser light and its short wavelength (e.g., about 905 nm to about 1,550 nm), LiDAR using infrared (IR) light may achieve a better spatial or angular resolution (e.g., on the order of 0.1°) for both azimuth and elevation than radars, thereby enabling better object classification. This may allow for high-resolution 3D characterization of objects in a scene without significant backend processing. In contrast, radars using longer wavelengths, for example, about 4 mm for about 77 GHz signals, may not be able to resolve small features, especially as the distance increases. LiDAR systems may also have large horizontal (azimuth) FOVs, and better vertical (elevation) FOVs than radars. LiDAR systems can have very high performance at night. LiDAR systems using modulated LiDAR techniques may be robust against interference from other sensors.

The strength or signal level of the returned light pulses may be affected by many factors, including, but not limited to, the transmitted light signal strength, the light incident angle on an object, the object reflection or scattering characteristics, the attenuation by the propagation medium, the system front end gain or loss, the loss caused by optical components in LiDAR system 102, and the like. The noise floor may be affected by, for example, the ambient light level and front end gain settings. Generally, in a LiDAR system, the signal-to-noise ratio (SNR) of the measured signal for middle and long ranges may decrease with the increase in the distance of detection. For objects in a certain short or middle range (e.g., about 20 m), the signal levels of the returned light pulses may be much higher compared with the ambient noise level, and thus the SNR of the detection signal of the photodetector can be relatively high. On the other hand, light pulse signals returned from long ranges (e.g., about 200 m) may be significantly weaker and may have signal strength levels similar to the ambient noise level and thus a low SNR, or may not even be detected by some low sensitivity photodetectors. In addition, some LiDAR systems may have difficulty detecting objects at close distances because the time of flight is short and the LiDAR optics may be configured for middle to long range detection. For example, without a more complex assembly, one set of lenses may not be good for both short distances (e.g., <1 m) and long distances (e.g., >40 m).

Thus, even though not shown in FIG. 1, in some embodiments, vehicle 100 may include other sensors at various locations, such as, for example, cameras, ultrasonic sensors, radar sensors (e.g., short- and long-range radars), a motion sensor or an inertial measurement unit (IMU, e.g., an accelerometer and/or a gyroscope), a wheel sensor (e.g., a steering angle sensor or rotation sensor), a GNSS receiver (e.g., a GPS receiver), and the like. Each of these sensors may generate signals that provide information relating to vehicle 100 and/or the surrounding environment. Each of the sensors may send and/or receive signals (e.g., signals broadcast into the surrounding environment and signals returned from the ambient environment) that can be processed to determine attributes of features (e.g., objects) in the surrounding environment. LiDARs, radars, ultrasonic sensors, and cameras each have their own advantages and disadvantages. Highly or fully autonomous vehicles typically use multiple sensors to create an accurate long-range and short-range map of a vehicle's surrounding environment, for example, using sensor fusion techniques. In addition, it is also desirable to have sufficient overlap of coverage by the different sensors in order to increase redundancy and improve safety and reliability.

The cameras may be used to provide visual information relating to vehicle 100 and/or its surroundings, for example, for parking assistance, traffic sign recognition, pedestrian detection, lane markings detection and lane departure warning, surround view, and the like. The cameras may include a wide-angle lens, such as a fisheye lens that can provide a large (e.g., larger than 150°) angle of view. Multiple cameras may provide multiple views that can be stitched together to form an aggregated view. For example, images from cameras located at each side of vehicle 100 can be stitched together to form a 360° view of the vehicle and/or its surrounding environment. Cameras are cost-efficient, easily available, and can provide color information. However, cameras may depend strongly on the ambient light conditions, and significant processing may need to be performed on the captured images to extract useful information.

In some embodiments, vehicle 100 may include ultrasonic sensors on the front bumper, the driver side, the passenger side, and/or the rear bumper of vehicle 100. The ultrasonic sensors may emit ultrasonic waves that can be used by the vehicle control system to detect objects (e.g., people, structures, and/or other vehicles) in the surrounding environment. In some embodiments, the vehicle control system may also use the ultrasonic waves to determine speeds, positions (including distances), and/or other attributes of the objects relative to vehicle 100. The ultrasonic sensors may also be used, for example, for parking assistance. Ultrasonic waves may suffer from strong attenuation in air beyond a few meters. Therefore, ultrasonic sensors are primarily used for short-range object detection.

An IMU may measure the speed, linear acceleration or deceleration, angular acceleration or deceleration, or other parameters related to the motion of vehicle 100. A wheel sensor may include, for example, a steering angle sensor that measures the steering wheel position angle and rate of turn, a rotary speed sensor that measures wheel rotation speed, or another wheel speed sensor.

Radar sensors may emit radio frequency waves that can be used by the vehicle control system to detect objects (e.g., people, structures, and/or other vehicles) in the surrounding environment. In some embodiments, the vehicle control system may use the radio frequency waves to determine speeds, positions (including distances), and/or other attributes of the objects. The radar sensors may include long-range radars, medium-range radars, and/or short-range radars, and may be used, for example, for blind spot detection, rear collision warning, cross traffic alert, adaptive cruise control, and the like.

Figure 2:
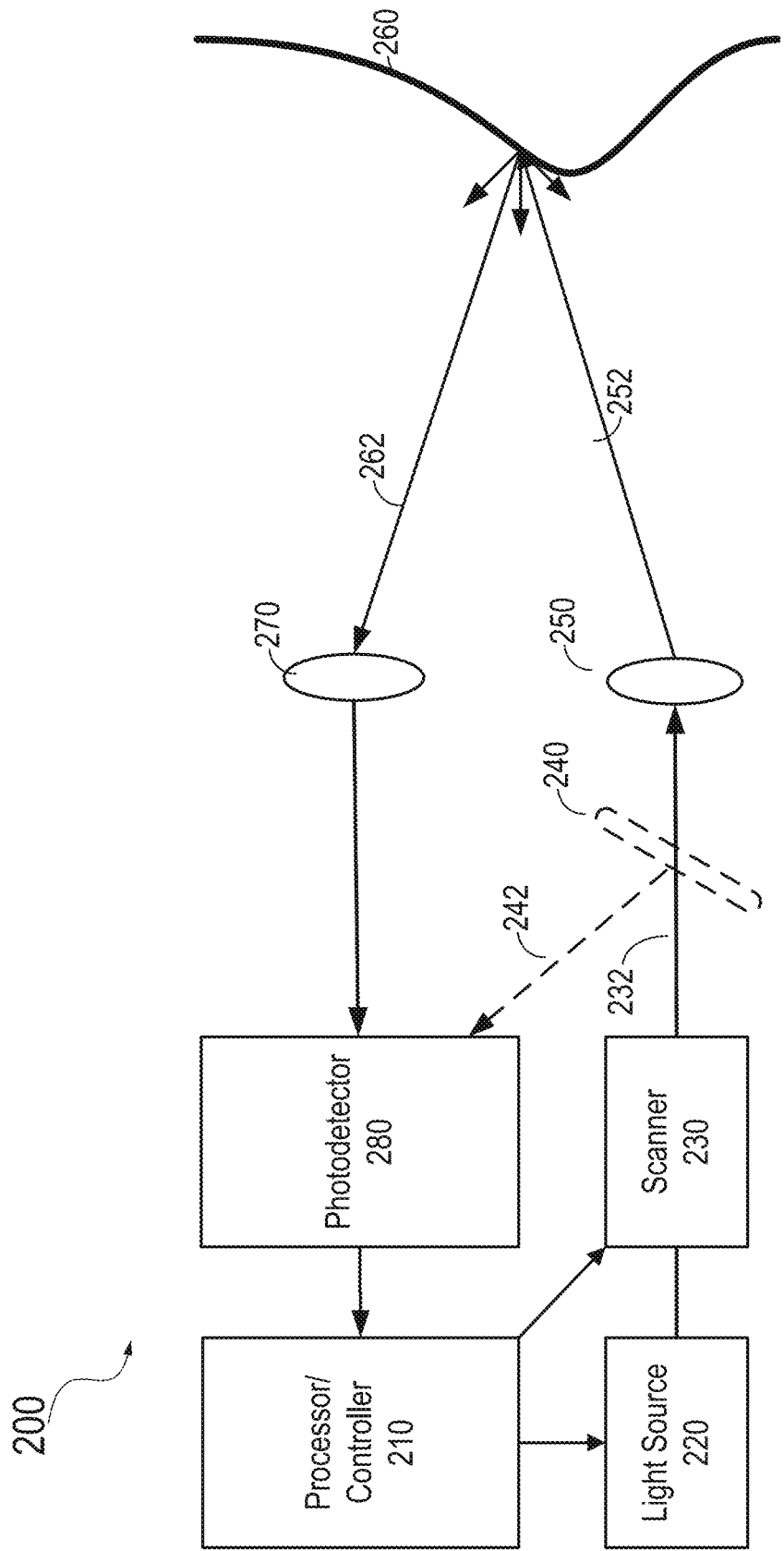
FIG. 2 is a simplified block diagram of an example of a LiDAR system according to certain embodiments.

FIG. 2 is simplified block diagram of an example of a LiDAR system 200 according to certain embodiments. LiDAR system 200 may include a transmitter that may include a processor/controller 210, a light source 220, a scanner 230 for scanning an output light beam from light source 220, and a transmitter lens 250. Light source 220 may include, for example, a laser, a laser diode, a vertical cavity surface-emitting laser (VCSEL), a light-emitting diode (LED), or other optical sources. The laser may include, for example, an infrared pulsed fiber laser or other mode-locked laser with an output wavelength of, for example, 930-960 nm, 1030-1070 nm, around 1550 nm, or longer. Processor/controller 210 may control light source 220 to transmit light pulses. Scanner 230 may include, for example, a rotating platform driven by a motor, a multi-dimensional mechanical stage, a Galvo-controlled mirror, a microelectromechanical (MEMS) mirror driven by micro-motors, a piezoelectric translator/transducer using piezoelectric material such as a quartz or lead zirconate titanate (PZT) ceramic, an electromagnetic actuator, a resonant fiber scanner, or an acoustic actuator. In one example, LiDAR system 200 may include a single-point scanning system that uses a micro-electro-mechanical system (MEMS) combined with a mirror to reflect a pulsed light beam to a single point in the field of view. In some embodiments, scanner 230 may not include a mechanically moving component, and may use, for example, a phased array technique where phases of an array of light beams (e.g., from lasers in a one-dimensional (1-D) or two-dimensional (2-D) laser array) may be modulated to alter the wavefront of the superimposed light beam. Transmitter lens 250 may direct a light beam 232 towards a target 260 as shown by light beam 252.

LiDAR system 200 may include a receiver that may include a receiver lens 270, a photodetector 280, and processor/controller 210. Reflected or scattered light beam 262 from target 260 may be collected by receiver lens 270 and directed to photodetector 280. Photodetector 280 may include a detector having a working (sensitive) wavelength comparable with the wavelength of light source 220. Photodetector 280 may be a high speed photodetector, such as a PIN photodiode with an intrinsic region between a p-type semiconductor region and an n-type semiconductor region, a silicon photomultiplier (SiPM) sensor, an avalanche photodetector (APD), and the like. Processor/controller 210 may be used to synchronize and control the operations of light source 220, scanner 230, and photodetector 280, and analyze measurement results based on the control signals for light source 220 and scanner 230, and the signals detected by photodetector 280.

In some embodiments, a beam splitter 240 may split light beam 232 from scanner 230 and direct a portion of light beam 232 towards photodetector 280 as shown by light beam 242 in FIG. 2. Light beam 242 may be directed to photodetector 280 by beam splitter 240 directly or indirectly through one or more mirrors. In some embodiments, the light beam from the light source may be split and directed to the receiver before entering scanner 230. By partially directing the transmitted pulses near the transmission source to photodetector 280, the pulses captured by photodetector 280 immediately after transmission can be used as the transmitted pulses or reference pulses for determining the time of flight. To measure the time of flight, approximate positions of transmitted and returned pulses must be identified within the waveform of the detection signal of photodetector 280. A LiDAR system may use, for example, a leading-edge detector, a peak detector, or a matched-filter detector, to recover transmitted and/or returned light pulses in the detection signal from the photodetector.

In the example illustrated in FIG. 2, LiDAR system 200 may be a non-coaxial LiDAR system, where the receiver and the transmitter may use different optical components, and the outgoing light and the returned light may not spatially overlap. In some embodiments, the LiDAR systems may be coaxial systems, where, for example, the outgoing light and the returned light may be scanned by a same scanner and may at least spatially overlap at the scanner.

Figure 3A:
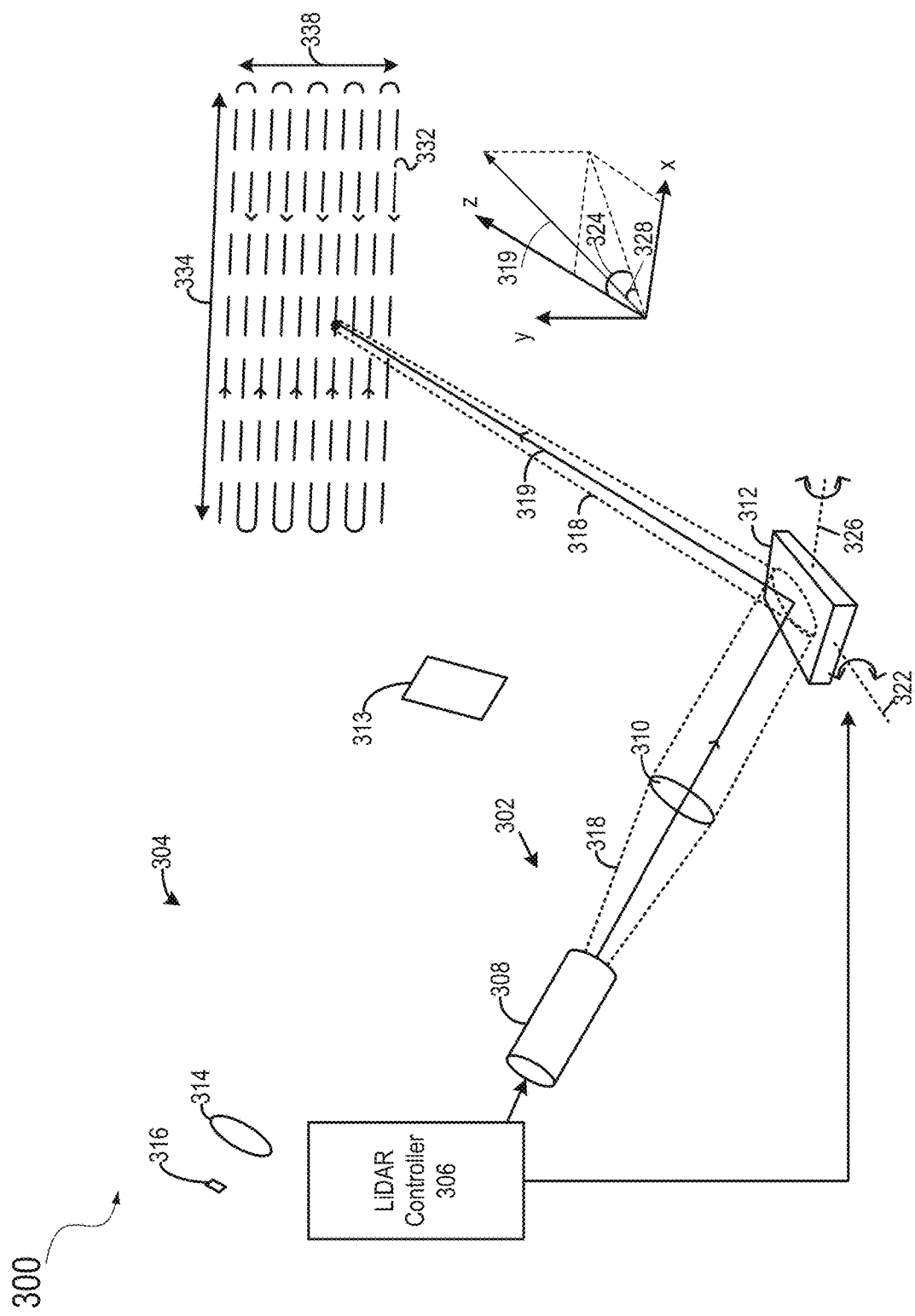
FIGS. 3A and 3B illustrate an example of a LiDAR system according to certain embodiments.
Figure 3B:
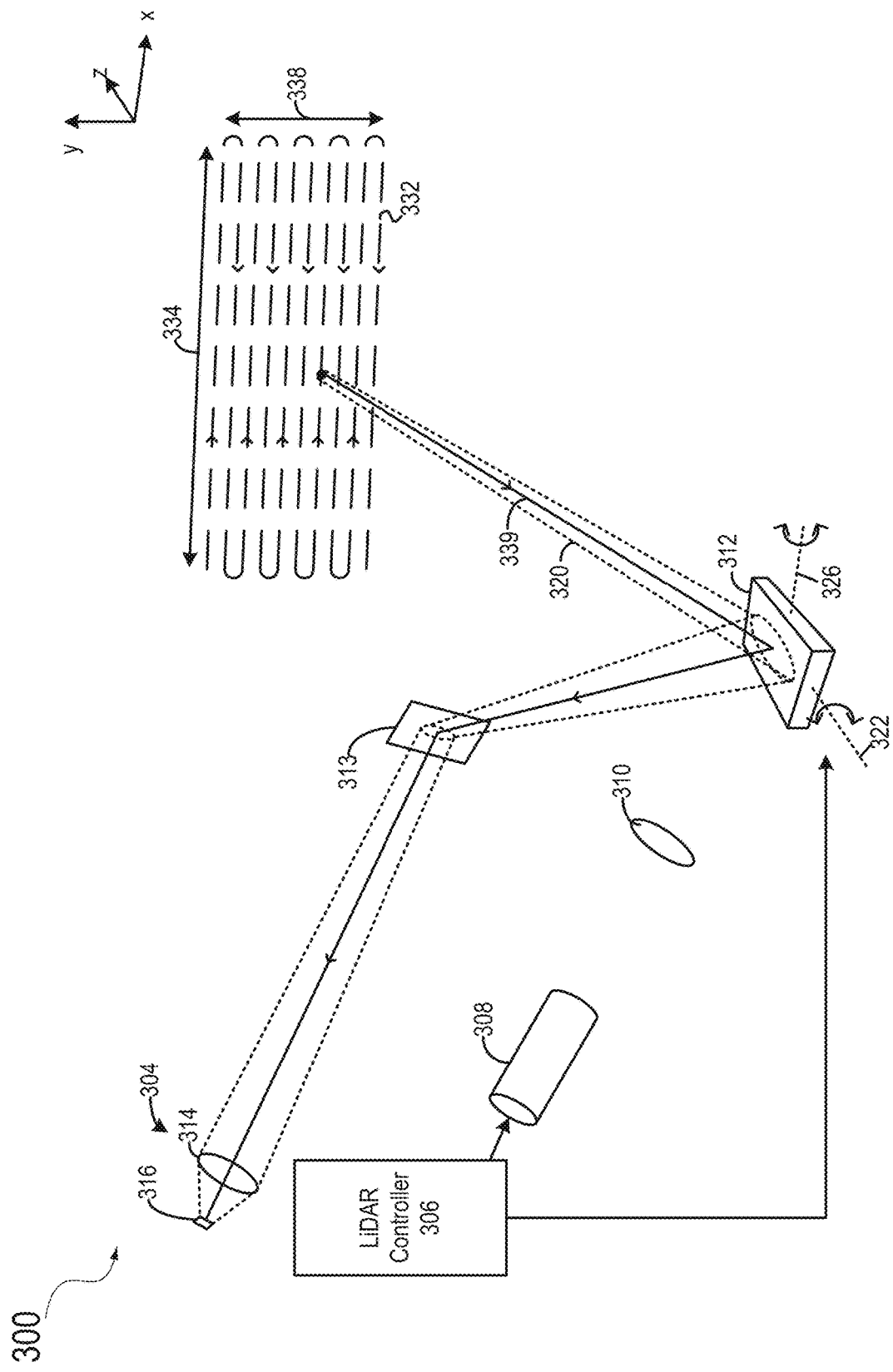

FIG. 3A and FIG. 3B illustrate simplified block diagram of an example of a LiDAR module 300 according to certain embodiments. LiDAR module 300 may be an example of LiDAR system 102, and may include a transmitter 302, a receiver 304, and a LiDAR controller 306 that controls the operations of transmitter 302 and receiver 304. Transmitter 302 may include a light source 308 and a collimator lens 310, whereas receiver 304 may include a lens 314 and a photodetector 316. LiDAR module 300 may further include a mirror assembly 312 and a beam deflector 313. In some embodiments, transmitter 302 and receiver 304 may be configured to share mirror assembly 312 (e.g., using a beam splitter/combiner) to perform light steering and detecting operation, with beam deflector 313 configured to reflect incident light reflected by mirror assembly 312 to receiver 304. In some embodiments, beam deflector 313 may also be shared by transmitter 302 and receiver 304 (e.g., via a beam splitter/combiner), where outgoing light from light source 308 and reflected by mirror assembly 312 may also be reflected by beam deflector 313, while the returned beam may be deflected by mirror assembly 312 and beam deflector 313 to lens 314 and photodetector 316.

FIG. 3A illustrates an example of a beam steering operation by LiDAR module 300. To project light, LiDAR controller 306 can control light source 308 to transmit a light beam 318 (e.g., light pulses, an FMCW light signal, an AMCW light signal, etc.). Light beam 318 may diverge upon leaving light source 308 and may be collimated by collimator lens 310. The collimated light beam 318 may propagate with substantially the same beam size.

The collimated light beam 318 may be incident upon mirror assembly 312, which can reflect and steer the light beam along an output projection path 319 towards a field of interest, such as object 112. Mirror assembly 312 may include one or more rotatable mirrors, such as a one-dimensional or two-dimensional array of micro-mirrors. Mirror assembly 312 may also include one or more actuators (not shown in FIG. 3A) to rotate the rotatable mirrors. The actuators may rotate the rotatable mirrors around a first axis 322, and/or may rotate the rotatable mirrors around a second axis 326. The rotation around first axis 322 may change a first angle 324 (e.g., longitude angle) of output projection path 319 with respect to a first dimension (e.g., the x-axis or z-axis), whereas the rotation around second axis 326 may change a second angle 328 (e.g., altitude angle) of output projection path 319 with respect to a second dimension (e.g., the y-axis). LiDAR controller 306 may control the actuators to produce different combinations of angles of rotation around first axis 322 and second axis 326 such that the movement of output projection path 319 can follow a scanning pattern 332. A range 334 of movement of output projection path 319 along the x-axis, as well as a range 338 of movement of output projection path 319 along the y-axis, can define a FOV. An object within the FOV, such as object 112, can receive and scatter the collimated light beam 318 to form returned light signals, which can be received by receiver 304.

FIG. 3B illustrates an example of a returned beam detection operation by LiDAR module 300. LiDAR controller 306 can select an incident light direction 339 for detection of incident light by receiver 304. The selection can be based on setting the angles of rotation of the rotatable mirrors of mirror assembly 312, such that only light beam 320 propagating along incident light direction 339 is reflected to beam deflector 313, which can then divert light beam 320 to photodetector 316 via lens 314. Photodetector 316 may include any suitable high-speed detector that can detect light pulses in the working wavelength of the LiDAR system, such as a PIN photodiode, a silicon photomultiplier (SiPM) sensor, or an avalanche photodetector. With such arrangements, receiver 304 can selectively receive signals that are relevant for the ranging/imaging of a target object, such as light pulse 110 generated by the reflection of the collimated light beam by object 112, and not to receive other signals. As a result, the effect of environment disturbance on the ranging/imaging of the object can be reduced, and the system performance can be improved.

Figure 4:
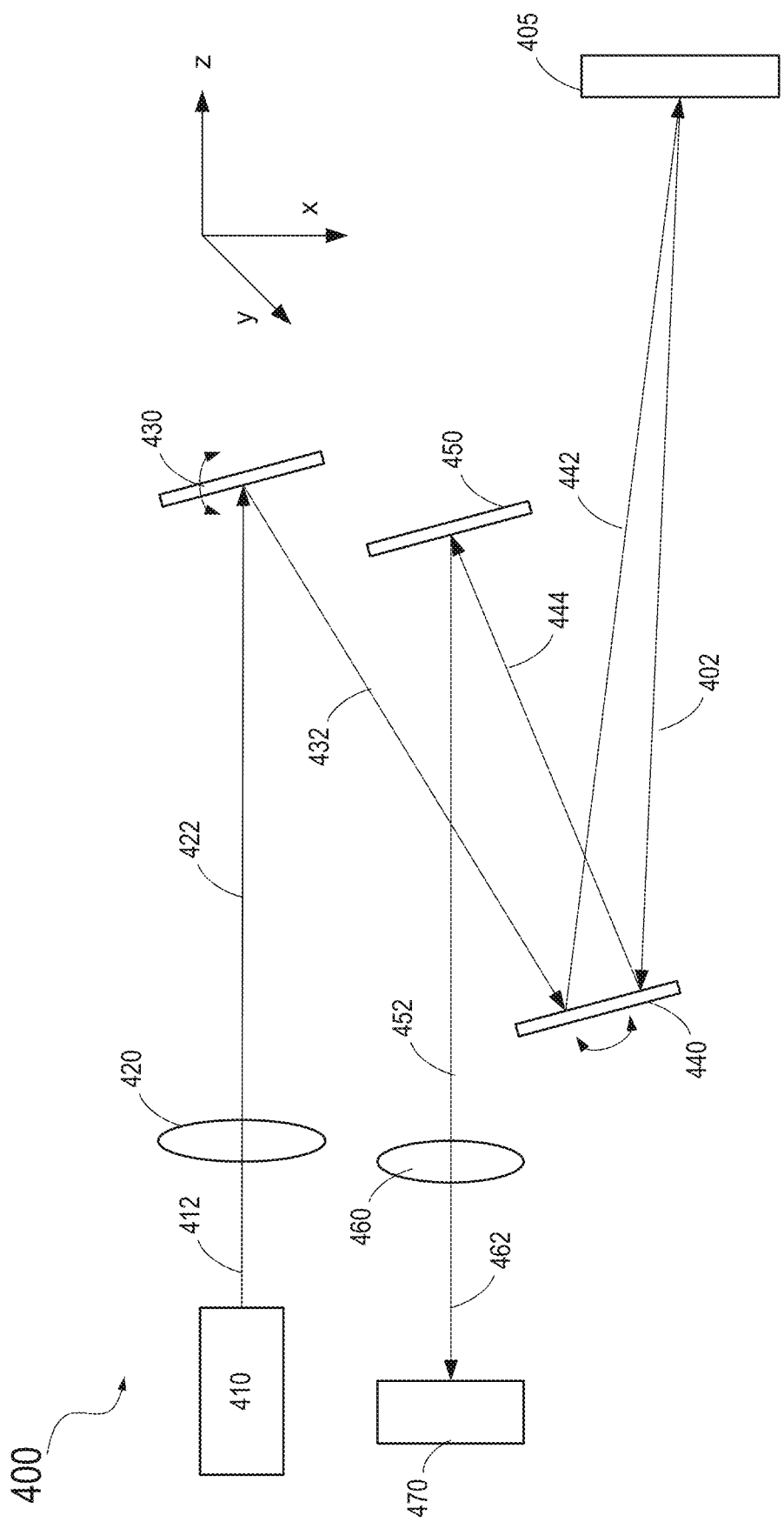
FIG. 4 is a simplified diagram of an example of an optical subsystem in a LiDAR system according to certain embodiments.

FIG. 4 is a simplified block diagram of an example of an optical subsystem 400 in a LiDAR system, such as LiDAR system 102 shown in FIG. 1, according to certain embodiments. In some embodiments, a plurality of optical subsystems 400 can be integrated into the LiDAR system to achieve, for example, 360° coverage in the transverse plane. In one example, a LiDAR system may include eight optical subsystems 400 distributed around a circle, where each optical subsystem 400 may have a field of view about 45° in the transverse plane.

In the example shown in FIG. 4, optical subsystem 400 may include a light source 410, such as a laser (e.g., a pulsed laser diode). A light beam 412 emitted by light source 410 may be collimated by a collimation lens 420. The collimated light beam 422 may be incident on a first deflector 430, which may be stationary or may rotate in at least one dimension such that collimated light beam 422 may at least be deflected by first deflector 430 towards, for example, different y locations. Collimated light beam 432 deflected by first deflector 430 may be further deflected by a second deflector 440, which may be stationary or may rotate in at least one dimension. For example, second deflector 440 may rotate and deflect collimated light beam 432 towards different x locations. Collimated light beam 442 deflected by second deflector 440 may reach a target point at a desired (x, y) location on a target object 405. As such, first deflector 430 and second deflector 440 may, alone or in combination, scan the collimated light beam in two dimensions to different (x, y) locations in a far field.

Target object 405 may reflect collimated light beam 442 by specular reflection or scattering. At least a portion of the reflected light 402 may reach second deflector 440 and may be deflected by second deflector 440 as a light beam 444 towards a third deflector 450. Third deflector 450 may deflect light beam 444 as a light beam 452 towards a receiver, which may include a lens 460 and a photodetector 470. Lens 460 may focus light beam 452 as a light beam 462 onto a location on photodetector 470, which may include a single photodetector or an array of photodetectors. Photodetector 470 may be any suitable high-speed detector that can detect light pulses in the working wavelength of the LiDAR system, such as a PIN photodiode, an SiPM sensor, or an avalanche photodetector. In some embodiments, one or more other deflectors may be used in the optical path to change the propagation direction of the light beam (e.g., fold the light beam) such that the size of optical subsystem 400 may be reduced or minimized without impacting the performance of the LiDAR system. For example, in some embodiments, a fourth deflector may be placed between third deflector 450 and lens 460, such that lens 460 and photodetector 470 may be placed in desired locations in optical subsystem 400.

The light deflectors described above may be implemented using, for example, a micro-mirror array, a galvo mirror, a stationary mirror, a grating, or the like. In one example, first deflector 430 may include a micro-mirror array, second deflector 440 may include a galvo mirror, and third deflector 450 and other deflectors may include stationary mirrors. A micro-mirror array can have an array of micro-mirror assemblies, with each micro-mirror assembly having a movable micro-mirror and an actuator (or multiple actuators). The micro-mirrors and actuators can be formed as a microelectromechanical system (MEMS) on a semiconductor substrate, which may allow the integration of the MEMS with other circuitries (e.g., controller, interface circuits, etc.) on the semiconductor substrate.

As described above, it may be desirable that a LiDAR system can detect objects in a wide range of distances, such as from about 1 meter to greater than about 200 meters. However, the strength or signal levels of the returned light pulses may be affected by the distance of the object, and many other factors. Generally, in a LiDAR system, the light intensities of the measured signals for middle and long ranges may decrease with the increase in the detection range. Light signals returned from long ranges (e.g., about 200 m) may be very weak and may have signal strength levels close to the ambient noise level, or may not even be detected by some photodetectors.

FIG. 5A illustrates an example of a LiDAR system 510 for detecting objects in different distance ranges. LiDAR system 510 may be installed on a vehicle 505, and may be used to detect objects, such as a subject 590 in a longer distance or an object 592 at a shorter distance in front of or surrounding vehicle 505. In the example shown in FIG. 5A, a transmitter of LiDAR system 510 may have a vertical field of view between a line 520 and a line 524. The receiver of LiDAR system 510 may have a vertical field of view between a line 530 and a line 534. The incident angles of the transmitted light on the objects and the angles of the reflected or scattered light that may reach the receiver may be different for objects at different ranges. In the illustrated example, the incident angle of the transmitted light (shown by line 524) on subject 590 at a far distance may be close to zero, and the reflection angle of the returned light from subject 590 (shown by line 534) that may reach the receiver may be around zero. The incident angle of the transmitted light (shown by a line 522) on object 592 at a middle range may be greater than zero, and the reflection angle of the returned light from object 592 (shown by a line 532) that may reach the receiver may be greater than zero. The incident angle of the transmitted light (shown by line 520) on objects at a short range may be much larger than zero, and the reflection angle of the returned light from the short range (shown by a line 530) that may reach the receiver may be much greater than zero.

FIG. 5B includes a curve 550 that illustrates an example of a relation between the received signal strength and the object distance for an example of a LiDAR system. As described above, the signal level of the returned light pulses may be affected by the distance of the object, and other factors, such as the transmitted light signal strength, the attenuation in the propagation medium, the interaction between the transmitted light and the objects, the properties of the objects, the performance of the receiver in the LiDAR system, and the like. In a simplified model, the number $N_s$ of received photons by the photodetector of the LiDAR system may be:

$$N_s = N_L \times T_1 \times \beta(\theta, R) \times T_2 \times \frac{A}{R^2} \times \eta \times G + N_B.$$

In the above equation, $N_L$ is the number of transmitted photons, $T_1$ is the transmissivity of the medium in the light path from the light source to the object, $\beta(\theta, R)$ is the probability that a transmitted photon is scattered by the object into a unit solid angle and may be a function of the cosine of the incident angle $\theta$ and the range R, $T_2$ is the transmissivity of the medium in the light path from the object to the receiver, $$\frac{A}{R^2}$$

is the probability that a scattered photon is collected by the receiver (the solid angle subtended by the receiver aperture with an area A from the scattering object), $\eta$ is the optical efficiency of the LiDAR hardware (e.g., mirrors, lenses, filters, detectors, etc.), and G is the geometrical form factor that describes the overlap between the area of light irradiation with the field of view of the receiver optics and is a function of range R. $N_B$ is the background noise and other noises, such as solar radiation, streetlights, headlights, and electronic device noises. Therefore, as shown in FIG. 5B, the received signal strength may be the highest for middle range detection, and may be lower for short ranges and long ranges.

To increase the received signal strength, the transmitted power may be increased. However, due to safety concerns, the maximum output power of the light source (e.g., a laser) is regulated to keep the laser energy/output power below eye safety limits defined by the regulations. The regulations may impact the selection of the laser wavelength, the operating mode of the LiDAR system (e.g., pulsed or continuous), and the detection methods and the photodetectors. For example, in a flash LiDAR system where a 2D scene is illuminated at a same time, the received optical power may be proportional to $1/R^4$, where R is the distance. In beam-steering LiDAR systems, the received optical power may be proportional to $1/R^2$. Thus, beam-steering LiDAR systems may be better suited for long range detection.

LiDAR system usually employ lasers sources with wavelengths in the infrared band, such as from about 0.80 to about 1.55 µm, to take advantage of the atmospheric transmission window (and in particular of water) at these wavelengths, while using light beams not visible to human eyes. Lasers operating in shorter wavelengths in near-infrared (NIR) regions may have lower output power/energy limits as human eyes may focus shorter-wavelength NIR light onto retina thus concentrating the laser radiation onto a small region. Longer-wavelength NIR laser light may be absorbed in the cornea and thus may have higher output power/energy limits. For example, for a 1-ns laser pulse, the laser safety limit for 1550 nm may be 1,000,000 times higher than that for a laser operating at 905 nm. Some examples of lasers for use in LiDAR systems include solid-state lasers (SSL) and diode lasers (DLs).

Photodetectors are the photon sensing devices in LiDAR receivers for ToF measurement. A photodetector needs to have a high sensitivity to light in a certain wavelength range because only a small fraction of the light emitted by the laser may reach the photodetector. Si-based detectors may be used to detect light with wavelengths between about 0.3 µm and about 1.1 µm. InGaAs detectors may be used to detect light with wavelengths above 1.1 µm, although they may have acceptable sensitivities for light with wavelengths longer than 0.7 µm. The photodetectors may also need to have a high bandwidth for detecting short pulses, a minimal time jitter, a high dynamic range, and a high signal-to-noise ratio (S/N or SNR). The SNR may need to be greater than 1 for the detection to have useful information, and the higher the SNR, the more accurate the distance measurement may be. The noise in a LiDAR system may include, for example, unfiltered background, and dark current and gain variation of the photodetector and the amplifier. The measured distance uncertainty may be approximated by:

$$\sigma_d^2 \sim \frac{c^2}{4B^2 \frac{S}{N}},$$

where B is the detection bandwidth (set by the pulse duration), c is the speed of light in free space, and S/N is the signal-to-noise ratio. Thus, it is desirable that the photodetector has a high spectral photosensitivity, a high gain with a low noise, a low dark current, and a small terminal capacitance (for a higher bandwidth). There may be several types of detectors that can be used in LiDAR systems, such as PIN diodes, APDs, SPADs, multi-pixel photon counters (MPPC), and photomultiplier tubes (PMT). However, it may be difficult to make a photodetector that has all the desired performance described above.

In a coaxial LiDAR system, the outgoing light emitted by the laser source may be linearly polarized. The returned light from the far field may include randomized polarization components. Because the system is co-axial, the returned light may spatially overlap with the outgoing light emitted by the laser source and thus may need to be separated from the outgoing light, such that the returned light may be directed to a photodetector for detection. A PBS may be used to separate the outgoing light and the returned light, where the polarization component of the returned light that has a polarization state orthogonal to the polarization state of the outgoing light may be transmitted or reflected by the PBS to reach the photodetector that is separate from the light source. The polarization component of the returned light that has a polarization state same as the polarization state of the outgoing light may be transmitted or reflected by the PBS towards the light source and thus may not reach the photodetector. Due to the random polarization of the returned light, only about 50% of the returned light may be collected by the photodetector, resulting in an about 50% loss of the returned light and an about 50% reduction of the overall light collection efficiency. Thus, light sources with higher power or photodetectors with higher sensitivity may be needed for the object detection in a coaxial LiDAR system.

Figure 6:
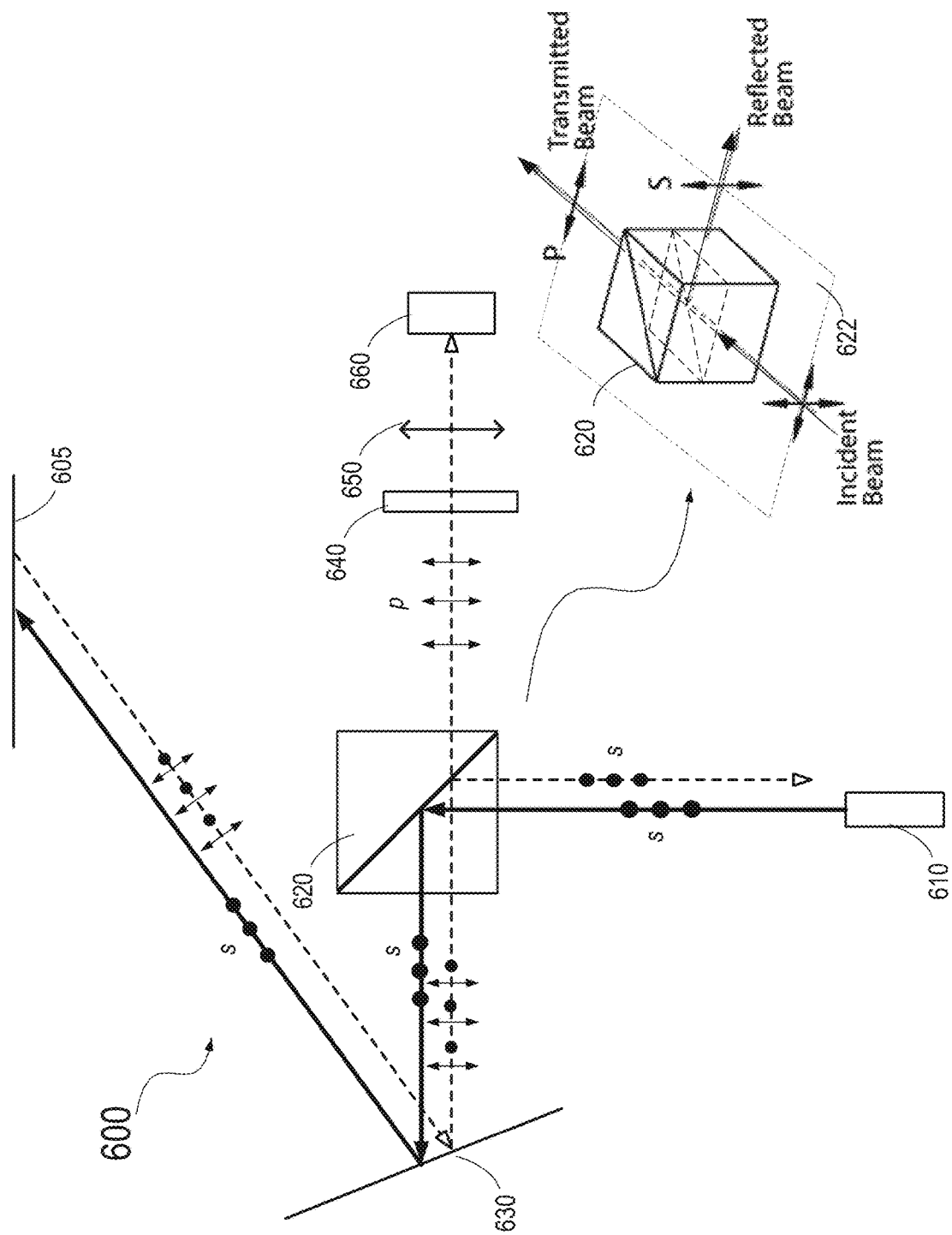
FIG. 6 illustrates an example of a coaxial LiDAR system.

FIG. 6 illustrates an example of a coaxial LiDAR system 600. Coaxial LiDAR system 600 may include a light source 610, such as a laser, that emits light signals, such as light pulses, FMCW light signals, or AMCW light signals in the infrared wavelength range as described above. The light signals emitted from light source 610 may be polarized light or may be polarized using a linear polarizer (not shown in FIG. 6). Coaxial LiDAR system 600 may further include a PBS cube 620. PBS cube 620 may reflect s-polarized light (the electric field of which is perpendicular to a plane of incidence 622, also referred to as transverse-electric (TE), sigma-polarized, or sagittal plane polarized wave). PBS cube 620 may transmit p-polarized light (the electric field of which is parallel to plane of incidence 622, also referred to as transverse-magnetic (TM), pi-polarized, or tangential plane polarized wave). In the example shown in FIG. 6, the light signals from light source 610 may be s-polarized light and thus may be reflected by PBS cube 620 to a scanner 630. Scanner 630 may be any type of optical scanner described above, such as a Galvo mirror or MEMS mirrors. Scanner 630 may direct the s-polarized light to a target 605.

Target 605 may scatter the s-polarized light into randomly polarized light that may include both s-polarized light and p-polarized light. A portion of the scattered light may be returned to scanner 630, which may direct the returned light to PBS cube 620. The p-polarized component of the returned light may pass through PBS cube 620 towards a photodetector 660. Photodetector 660 may be any photodetectors described above, and may convert the returned light into electrical signals. In some embodiments, a filter 640 may be used, for example, to block visible light from the ambient environment and transmit infrared light of interest. In some embodiments, a lens 650 may be used to focus the returned light onto photodetector 660. The s-polarized component of the returned light may be reflected by PBS cube 620 back towards light source 610. Thus, the s-polarized component of the returned light may not be received by photodetector 660. As such, only about a half of the returned light directed by scanner 630 to PBS cube 620 may be detected by photodetector 660. Thus, the optical efficiency η of the LiDAR hardware is reduced. As discussed above, for long range detection, the light returned to the LiDAR system may have a very low intensity. The loss of the s-polarized light inside the LiDAR system may further reduce the intensity of the returned light incident on photodetector 660 and thus the SNR of the electrical signal generated by photodetector 660, even if photodetector 660 is sufficiently sensitive to detect the low intensity light.

According to certain embodiments, a non-reciprocal polarization rotator including a Faraday rotator may be used in a coaxial LiDAR system to achieve close to 100% light collection efficiency within the LiDAR system. The Faraday rotator is a directional (non-reciprocal) polarization optical element, and thus may be used with a reciprocal polarization optical component (e.g., a waveplate) to convert polarized light propagating in one direction from a first polarization state to a second orthogonal polarization state, while maintaining the polarization state of polarized light propagating in the opposite direction. Linearly polarized outgoing light from the light source may pass through the non-reciprocal polarization rotator and may be incident on an object. The returned light reflected or scattered by the object may be randomly polarized. The be randomly polarized returned light may be separated by a first PBS into two portions having orthogonal polarization directions. A first portion of the two portions may propagate towards the photodetector, and the second portion may propagate towards the light source and pass through the non-reciprocal polarization rotator. Due to the opposite propagating directions within the Faraday rotator, the outgoing light reaching the non-reciprocal polarization rotator from the light source and the second portion of the returned light passing through the non-reciprocal polarization rotator may have different polarization states, and thus can be separated using, for example, a second polarization beam splitter or a birefringent device. The first portion and the second portion of the returned light may be combined by another PB S and may be directed to the photodetector. In this way, close to 100% of the returned light received by the LiDAR system may be directed to the photodetector to generate detection signals. Thus, the signal-to-noise ratio of the LiDAR system can be improved to achieve a high accuracy and a high sensitivity.

Figure 7A:
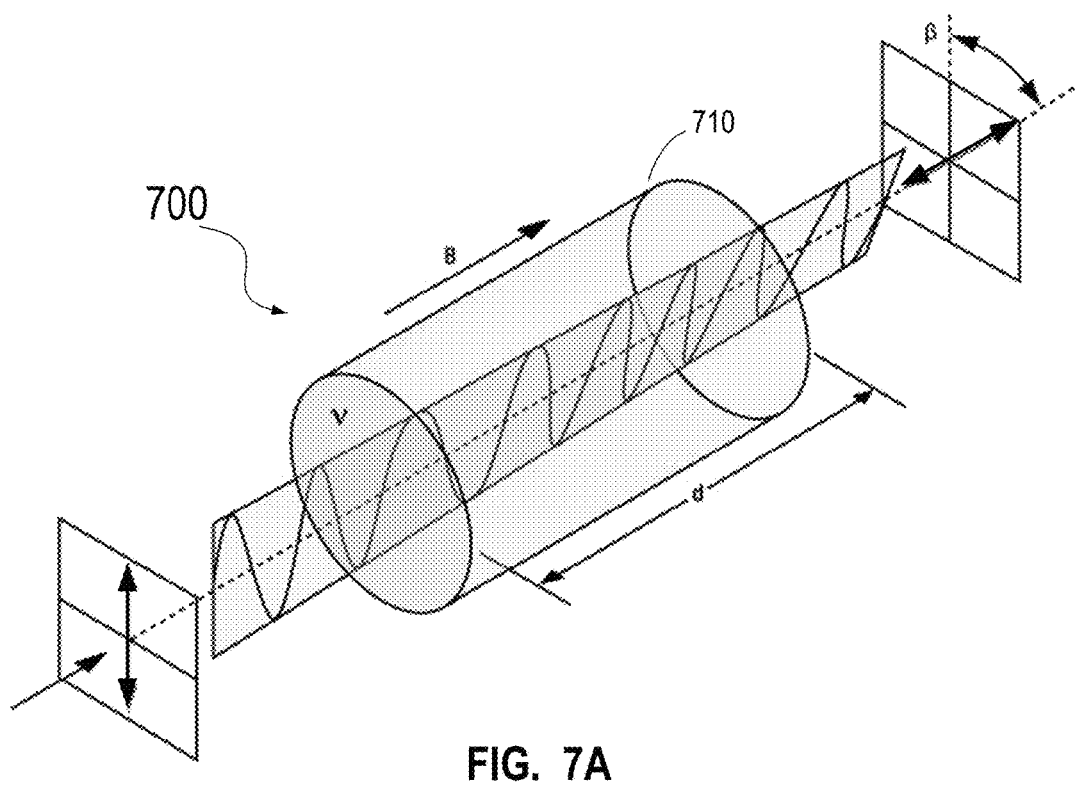
FIG. 7A illustrates an example of a Faraday rotator.

FIG. 7A illustrates an example of a Faraday rotator 700. Faraday rotator 700 is a polarization rotator based on a magneto-optic effect where one polarization component of the input light may be in ferromagnetic resonance with a crystal 710 (e.g., a Bismuth-substitute yttrium iron garnet (Bi:YIG) crystal), causing its phase velocity to be higher than the other polarization component. Thus, the polarization state of a linearly polarized light passing through crystal 710 may be rotated when a magnetic field parallel to the propagation direction is applied to crystal 710. The angle of rotation may be determined according to $\beta=VBd$, where B is the magnetic flux density in the direction of propagation (in teslas), d is the length (in meters) of the path in which the light and the magnetic field interact, and V is the Verdet constant (in units of radians per tesla per meter, rad/(T·m)) of crystal 710. The Verdet constant V may vary with the light wavelength and the operating temperature.

The Faraday rotation is an example of non-reciprocal optical propagation. After a polarized beam has passed through a Faraday medium and has been rotated by the Faraday medium in a forward pass, reflecting the rotated polarized beam back through the same Faraday medium would not reverse the rotation of the polarization direction experienced by the polarized beam in the forward pass. In contrast, in a reciprocal medium, the polarization direction may rotate in the same sense (e.g., a left- or right-handed rotation or a clockwise or counter-clockwise rotation) when viewed in the light propagation direction during both the forward and backward passes. Thus, sending linearly polarized light through the reciprocal medium and then reflecting the rotated linearly polarized light back through the reciprocal medium may reverse the rotation and return the incident linearly polarized beam to its original polarization direction.

Figure 7B:
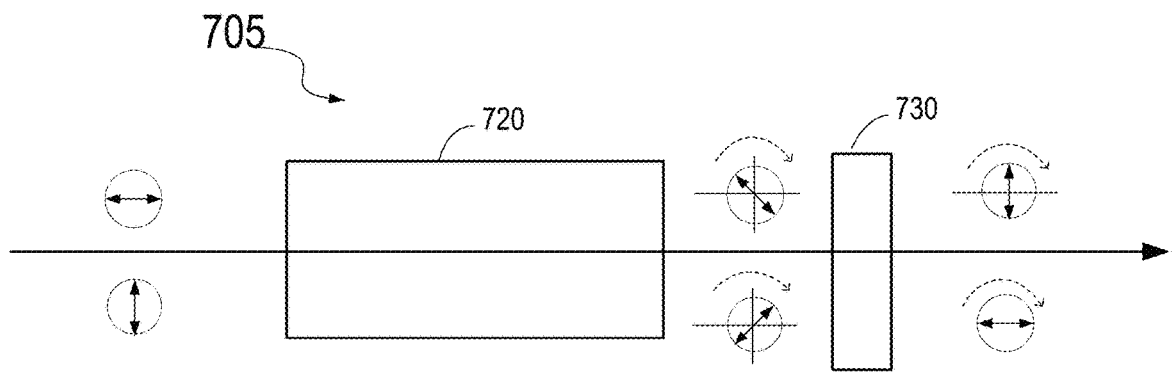
FIG. 7B illustrates an example of a linearly polarized light beam passing through an example of a non-reciprocal polarization rotator in a forward pass.

FIG. 7B illustrates an example of a linearly polarized light beam passing through an example of a non-reciprocal polarization rotator 705 in a forward pass. Non-reciprocal polarization rotator 705 may include a Faraday rotator 720 and a half-wave plate 730. Faraday rotator 720 may have a certain length and may experience a certain magnetic field such that Faraday rotator 720 may cause a 45° clockwise rotation of the polarization direction of linearly polarized light passing through Faraday rotator 720. Half-wave plate 730 may also be used to rotate the polarization direction of the linearly polarized light, where the rotation angle may be twice the angle between the fast axis of half-wave plate 730 and the plane of polarization (polarization direction) of the input linearly polarized light. For example, placing half-wave plate 730 such that the its fast axis is at 45° with respect to the plane of polarization of a linearly polarized light may result in a 90° rotation of the polarization direction of the linearly polarized light. Placing half-wave plate 730 such that the its fast axis is at 22.5° with respect to the plane of polarization of a linearly polarized light may result in a 45° rotation of the polarization direction of the linearly polarized light. In the illustrate example, half-wave plate 730 may be oriented such that it may further rotate the polarization direction of the linearly polarized light by 45° in the clockwise direction. Thus, in the forward pass, the polarization direction of the linearly polarized light may be rotated by 90° by the combination of Faraday rotator 720 and half-wave plate 730.

For example, as illustrated in FIG. 7B, in the forward pass, the polarization direction of a horizontally polarized light beam may be rotated by Faraday rotator 720 by 45° in the clockwise direction, and half-wave plate 730 may further rotate the polarization direction of the polarized light beam by 45° in the clockwise direction, such that the polarization direction of the incident horizontally polarized light beam may be rotated by Faraday rotator 720 and half-wave plate 730 by a total of 90° in the clockwise direction to become vertically polarized. Similarly, in the forward pass, the polarization direction of a vertically polarized light beam may be rotated by Faraday rotator 720 by 45° in the clockwise direction, and half-wave plate 730 may further rotate the polarization direction of the polarized light beam by 45° in the clockwise direction, such that the polarization direction of the incident vertically polarized light beam may be rotated by Faraday rotator 720 and half-wave plate 730 by a total of 90° in the clockwise direction to become horizontally polarized.

Figure 7C:
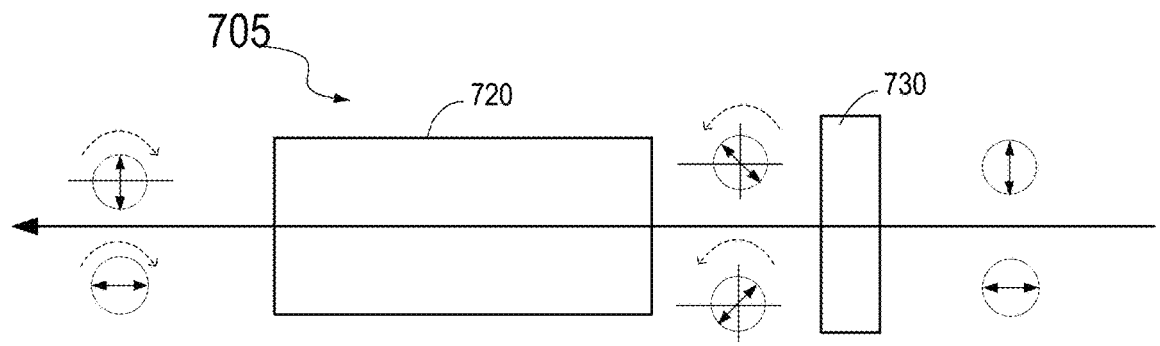
FIG. 7C illustrates an example of a linearly polarized light beam passing through an example of a non-reciprocal polarization rotator in a backward pass.

FIG. 7C illustrates an example of a linearly polarized light beam passing through the example of non-reciprocal polarization rotator 705 in a backward pass. In the backward pass, half-wave plate 730 may rotate the polarization direction of a linearly polarized light beam by 45° in the counter-clockwise direction, and Faraday rotator 720 may rotate the polarization direction of the linearly polarized light beam by 45° in the clockwise direction. Thus, in the backward pass, the polarization direction of the linearly polarized light beam may be rotated by 0° by the combination of Faraday rotator 720 and half-wave plate 730.

For example, as illustrated in FIG. 7C, in the backward pass, the polarization direction of an incident vertically polarized light beam may be rotated by half-wave plate 730 by 45° in the counter-clockwise direction, and Faraday rotator 720 may rotate the polarization direction of the polarized light beam by 45° in the clockwise direction, such that the polarization direction of the incident vertically polarized light beam may be rotated by Faraday rotator 720 and half-wave plate 730 by a total of 0° to remain vertically polarized. Similarly, in the backward pass, the polarization direction of an incident horizontally polarized light beam may be rotated by half-wave plate 730 by 45° in the counter-clockwise direction, and Faraday rotator 720 may rotate the polarization direction of the polarized light beam by 45° in the clockwise direction, such that the polarization direction of the incident horizontally polarized light beam may be rotated by Faraday rotator 720 and half-wave plate 730 by a total of 0° to remain horizontally polarized.

Figure 8:
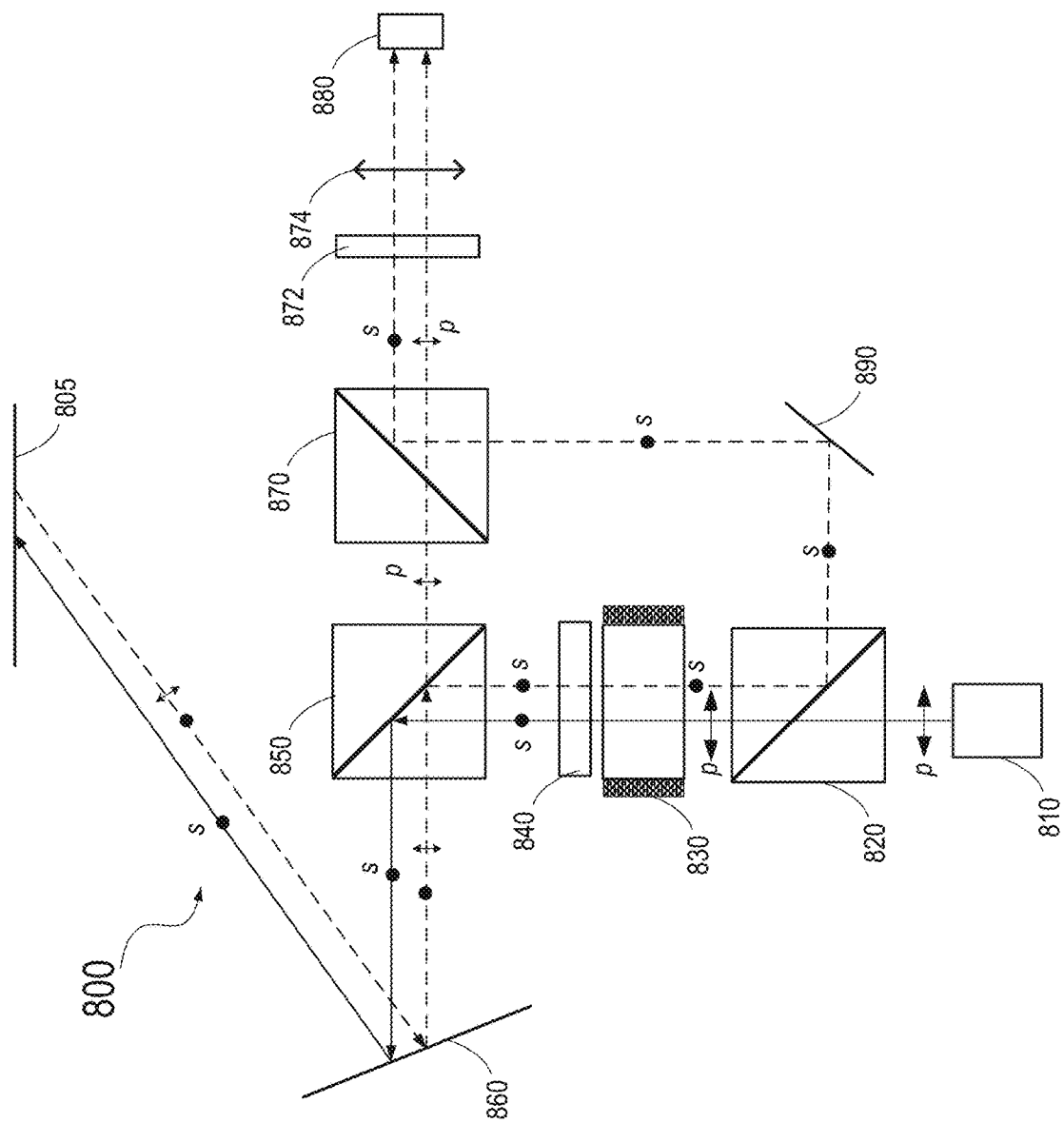
FIG. 8 illustrates an example of a coaxial LiDAR system including a non-reciprocal polarization rotator for improving the returned light collection efficiency according to certain embodiments.

FIG. 8 illustrates an example of a coaxial LiDAR system 800 including a non-reciprocal polarization rotator for improving the returned light collection efficiency according to certain embodiments. In the example show in FIG. 8, coaxial LiDAR system 800 may include a light source 810 that may emit p-polarized light or may include a polarizer that may polarize the emitted light to p-polarized light. The p-polarized light may pass through a first PBS 820, which may be similar to PBS cube 620 that can reflect s-polarized light and transmit p-polarized light. The p-polarized light may then pass through a Faraday rotator 830 and a half-wave plate 840 that may jointly form a non-reciprocal polarization rotator (e.g., non-reciprocal polarization rotator 705), and thus may become s-polarized light due to the 90° rotation by Faraday rotator 830 and half-wave plate 840 as described above with respect to the forward pass operation shown in FIG. 7B. The s-polarized light may be reflected by a second PBS 850, which may be similar to PBS cube 620 and first PBS 820. The s-polarized light reflected by second PBS 850 may be scanned by a scanner 860 to a target 805. Scanner 860 may be similar to scanner 630 or other optical scanners described above.

Target 805 may scatter the s-polarized light into randomly polarized light that may include both s-polarized light and p-polarized light. A portion of the scattered light may be returned to scanner 860, which may direct the returned light to second PBS 850. The p-polarized component of the returned light may pass through second PBS 850 and a third PBS 870 towards a photodetector 880. Photodetector 880 may be any photodetectors described above, and may convert the returned light into electrical signals. In some embodiments, optionally, a filter 872 (e.g., filter 640) may be used to block visible light from the ambient environment and transmit infrared light, and a lens 874 (e.g., lens 650) may be used to focus the returned light onto photodetector 880.

The s-polarized component of the returned light may be reflected by second PBS 850 back towards light source 810. The reflected s-polarized component of the returned light may pass through half-wave plate 840 and Faraday rotator 830 in the backward pass, where the s-polarized component of the returned light may remain s-polarized after passing through half-wave plate 840 and Faraday rotator 830 as described above with respect to the backward pass operation shown in FIG. 7C. The s-polarized light passing through Faraday rotator 830 may be reflected by first PBS 820 towards a reflector 890 (e.g., a mirror or a reflection prism). Reflector 890 may direct the s-polarized beam towards third PBS 870, which may reflect the s-polarized light toward photodetector 880. As such, both the s-polarized component and the p-polarized component of the returned light may be detected by photodetector 880. Thus, the optical efficiency η of the LiDAR hardware is improved.

Figure 9:
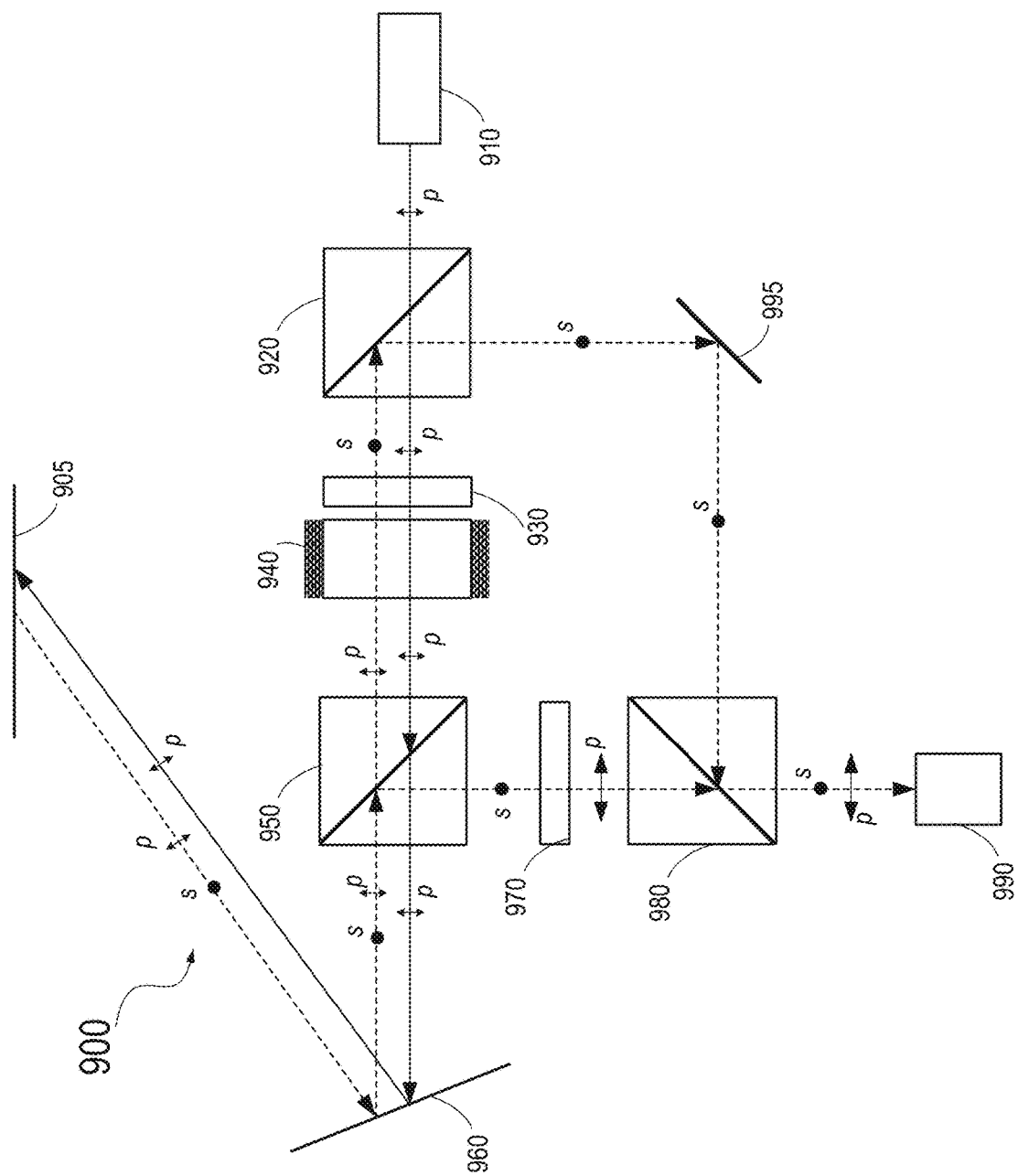
FIG. 9 illustrates an example of a coaxial LiDAR system including a non-reciprocal polarization rotator for improving the returned light collection efficiency according to certain embodiments.

FIG. 9 illustrates another example of a coaxial LiDAR system 900 including a non-reciprocal polarization rotator for improving the returned light collection efficiency according to certain embodiments. In the example show in FIG. 9, coaxial LiDAR system 900 may include a light source 910 that may emit p-polarized light or may include a polarizer that may polarize the emitted light to p-polarized light. The p-polarized light may pass through a first PBS 920, which may be similar to PBS cube 620 that can reflect s-polarized light and transmit p-polarized light. The p-polarized light may then pass through a half-wave plate 930 and a Faraday rotator 940 that may jointly form a non-reciprocal polarization rotator (e.g., non-reciprocal polarization rotator 705), and thus may remain p-polarized due to the 0° rotation by half-wave plate 930 and Faraday rotator 940 as described above with respect to the backward pass operation shown in FIG. 7C. The p-polarized light may be transmitted by a second PBS 950, which may be similar to first PBS 920 or PBS cube 620. The p-polarized light passing through second PBS 950 may be scanned by a scanner 960 to a target 905. Scanner 960 may be similar to scanner 630 or 860 or any other optical scanner described above.

Target 905 may scatter the p-polarized light into randomly polarized light that may include both s-polarized light and p-polarized light. A portion of the scattered light may be returned to scanner 960, which may direct the returned light to second PBS 950. The s-polarized component of the returned light may be reflected by second PBS 950. The s-polarized component of the returned light reflected by second PBS 950 may be converted to p-polarized light by a wave plate 970, which may be a half-wave plate oriented such that its fast axis is at 45° with respect to the plane of polarization of the s-polarized light to cause a 90° rotation of the polarization direction of the s-polarized light. The p-polarized light may pass through a third PBS 980 towards a photodetector 990. Photodetector 990 may be any photodetectors described above, and may convert the returned light into electrical signals. In some embodiments, as described above with respect to FIG. 6, a filter (e.g., filter 640, not shown in FIG. 9) may be used to block visible light from the ambient environment and transmit infrared light, and a lens (e.g., lens 650, not shown in FIG. 9) may be used to focus the returned light onto photodetector 990.

The p-polarized component of the returned light may pass through second PBS 950, Faraday rotator 940, and half-wave plate 930, where the p-polarized component of the returned light may be converted to s-polarized light after passing through Faraday rotator 940 and half-wave plate 930 as described above with respect to the forward pass operation shown in FIG. 7B. The s-polarized light may be reflected by first PBS 920 towards a reflector 995 (e.g., a mirror or a reflection prism). Reflector 995 may direct the s-polarized beam towards third PBS 980, which may reflect the s-polarized light toward photodetector 990. As such, both the s-polarized component and the p-polarized component of the returned light may be detected by photodetector 990. Thus, the optical efficiency η of the LiDAR hardware is improved.

Figure 10:
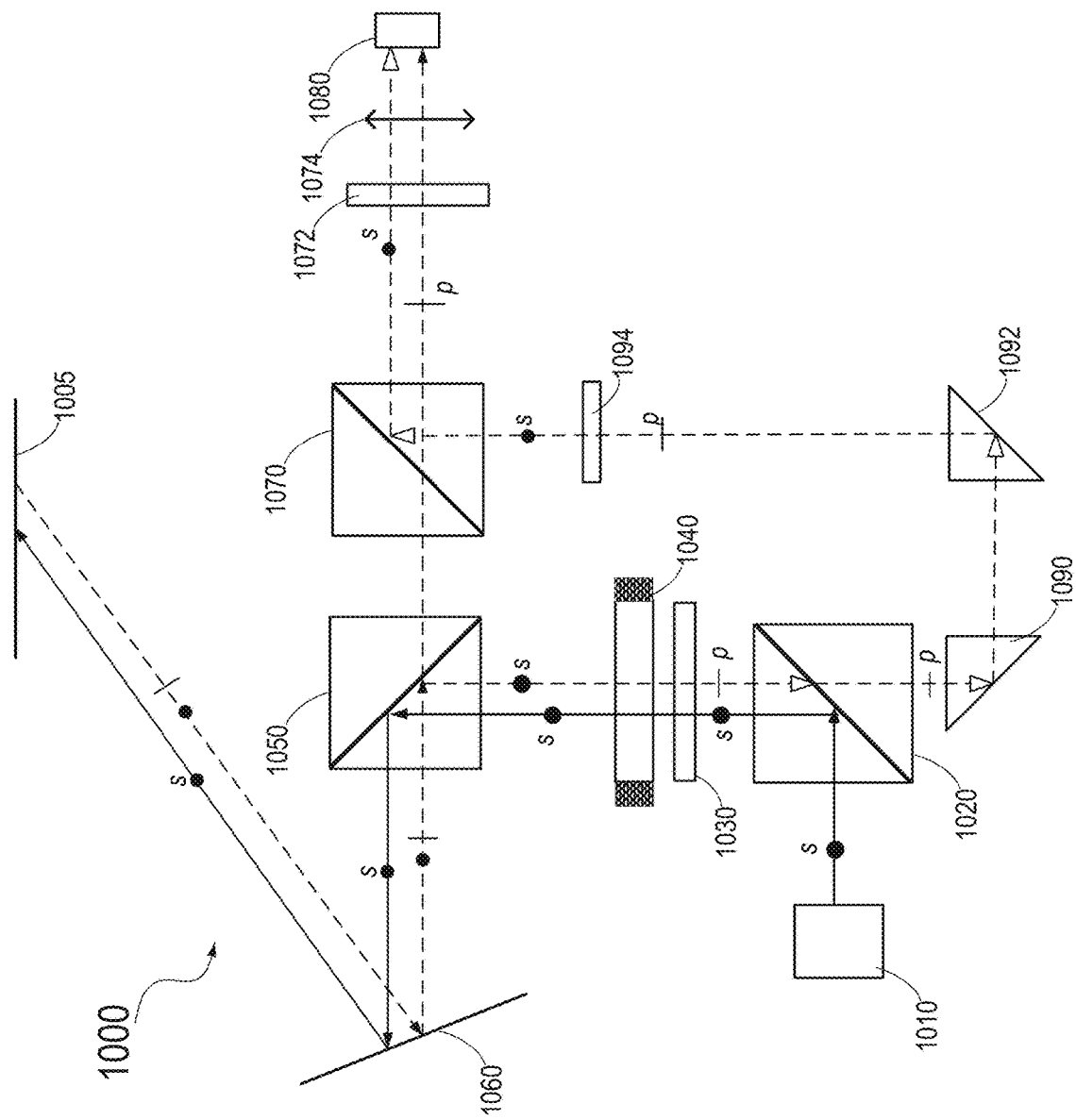
FIG. 10 illustrates an example of a coaxial LiDAR system including a non-reciprocal polarization rotator for improving the returned light collection efficiency according to certain embodiments.

FIG. 10 illustrates yet another example of a coaxial LiDAR system 1000 including a non-reciprocal polarization rotator for improving the returned light collection efficiency according to certain embodiments. In the example show in FIG. 10, coaxial LiDAR system 1000 may include a light source 1010 that may emit s-polarized light or may include a polarizer that may polarize the emitted light to s-polarized light. The s-polarized light may be reflected by a first PBS 1020, which may be similar to PBS cube 620 that can reflect s-polarized light and transmit p-polarized light. The s-polarized light may be directed to a half-wave plate 1030 and a Faraday rotator 1040 that may jointly form a non-reciprocal polarization rotator (e.g., non-reciprocal polarization rotator 705). The s-polarized light may remain s-polarized after passing through half-wave plate 1030 and Faraday rotator 1040 due to the 0° rotation by half-wave plate 1030 and Faraday rotator 1040 as described above with respect to the backward pass operation shown in FIG. 7C. The s-polarized light may be reflected by a second PBS 1050. The s-polarized light reflected by second PBS 1050 may be scanned by a scanner 1060 to a target 1005. Scanner 1060 may be similar to scanner 630 or any other optical scanner described above.

Target 1005 may scatter the s-polarized light into randomly polarized light that may include both s-polarized light and p-polarized light. A portion of the scattered light may be returned to scanner 1060, which may direct the returned light to second PBS 1050. The p-polarized component of the returned light may pass through second PBS 1050 and a third PBS 1070 towards a photodetector 1080. Photodetector 1080 may be any photodetectors described above, and may convert the returned light into electrical signals. In some embodiments, optionally, a filter 1072 (e.g., filter 640) may be used to block visible light from the ambient environment and transmit infrared light, and a lens 1074 (e.g., lens 650) may be used to focus the returned light onto photodetector 1080.

The s-polarized component of the returned light may be reflected by second PBS 1050 towards Faraday rotator 1040 and half-wave plate 1030. The s-polarized component of the returned light may become p-polarized after passing through Faraday rotator 1040 and half-wave plate 1030 as described above with respect to the forward pass operation shown in FIG. 7B. The p-polarized light passing through Faraday rotator 1040 and half-wave plate 1030 may propagate towards first PBS 1020. First PBS 1020 may transmit the p-polarized light to a reflector 1090. Reflector 1090 may direct the p-polarized beam towards a reflector 1092, which may reflect the p-polarized light to a wave plate 1094. Wave plate 1094 may be a half-wave plate and may be positioned as described above such that it can convert p-polarized light to s-polarized light. The s-polarized light may then be reflected by third PBS 1070 towards photodetector 1080. As such, both the s-polarized component and the p-polarized component of the returned light may be detected by photodetector 1080. Thus, the optical efficiency η of the LiDAR hardware is improved.

Figure 11:
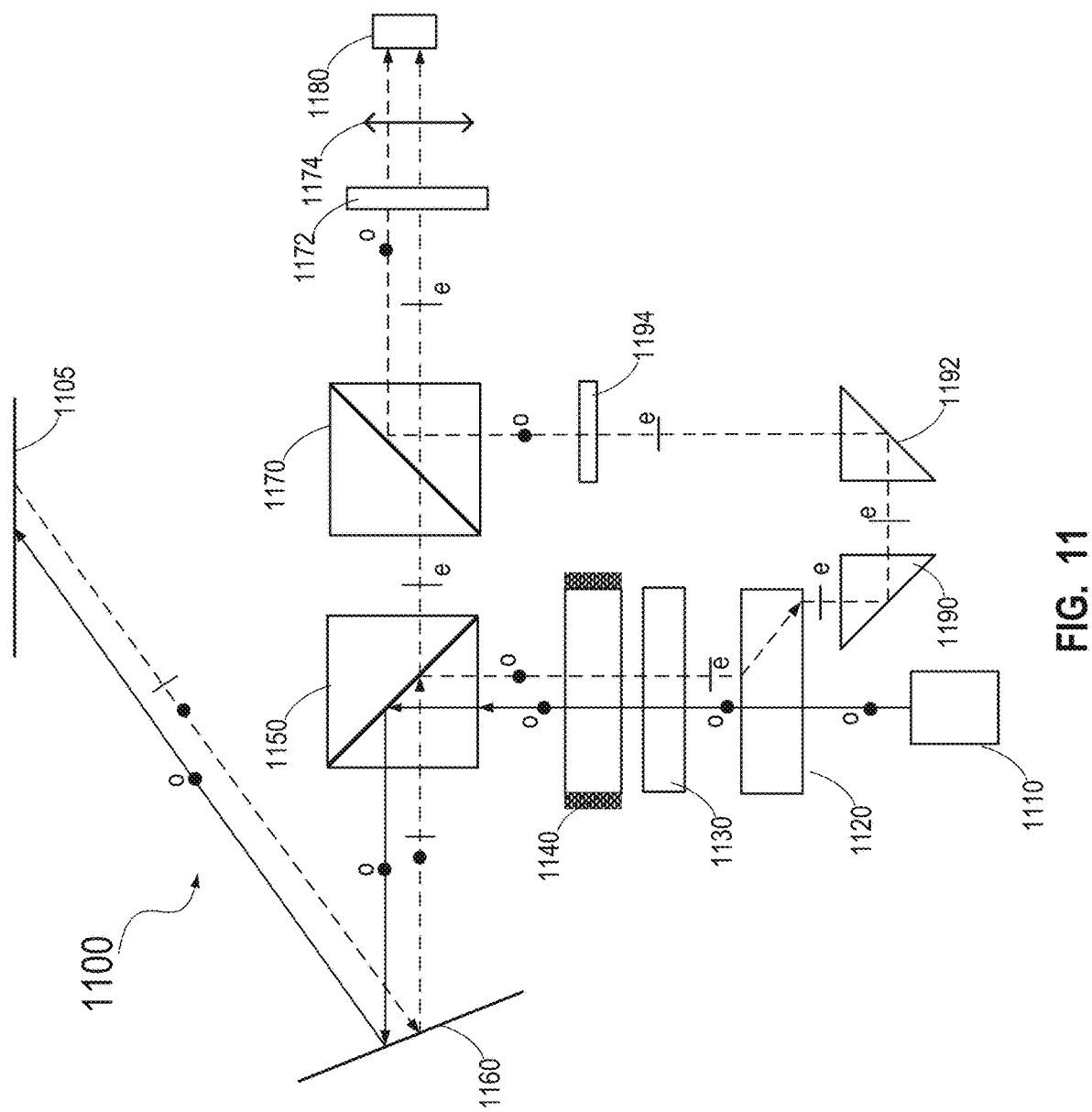
FIG. 11 illustrates an example of a coaxial LiDAR system including a non-reciprocal polarization rotator for improving the returned light collection efficiency according to certain embodiments.

FIG. 11 illustrates yet another example of a coaxial LiDAR system 1100 including a non-reciprocal polarization rotator for improving the returned light collection efficiency according to certain embodiments. In the example show in FIG. 11, coaxial LiDAR system 1100 may include a light source 1110 that may emit linearly polarized (e.g., s-polarized) light or may include a polarizer that may polarize the emitted light to s-polarized light. The s-polarized light may pass through a birefringent walk-off block 1120. Birefringent walk-off block 1120 may include a block of a birefringent material cut at a certain angle (≠90°) with respect to its optic axis and thus may be able to separate a surface-normally incident, unpolarized light into an ordinary ray (o-ray) and an extraordinary ray (e-ray). The s-polarized light from light source 1110 may pass through birefringent walk-off block 1120 as ordinary ray (o-ray) with no spatial walk-off.

The o-ray may then pass through a half-wave plate 1130 and a Faraday rotator 1140 that may jointly form a non-reciprocal polarization rotator (e.g., non-reciprocal polarization rotator 705), and thus may remain an o-ray due to the 0° rotation by half-wave plate 1130 and Faraday rotator 1140 as described above with respect to the backward pass operation shown in FIG. 7C. The o-ray may be reflected by a first PBS 1150, which may be similar to PBS cube 620 and may reflect the o-ray and transmit the e-ray. The o-ray reflected by first PBS 1150 may be scanned by a scanner 1160 to a target 1105. Scanner 1160 may be similar to scanner 630 or 860 or other optical scanner described above.

Target 1105 may scatter the o-ray into randomly polarized light that may include both the o-ray and the e-ray. A portion of the scattered light may be returned to scanner 1160, which may direct the returned light to first PBS 1150. The e-ray component of the returned light may be transmitted by first PBS 1150 and a second PBS 1170 to a photodetector 1180. Photodetector 1180 may be any photodetectors described above, and may convert the returned light into electrical signals. In some embodiments, optionally, a filter 1172 (e.g., filter 640) may be used to block visible light from the ambient environment and transmit infrared light, and a lens 1174 (e.g., lens 650) may be used to focus the returned light onto photodetector 1180.

The o-ray component of the returned light may be reflected by first PBS 1150, and pass through Faraday rotator 1140 and half-wave plate 1130, where the o-ray component of the returned light may be converted to the e-ray after passing through Faraday rotator 1140 and half-wave plate 1130 as described above with respect to the forward pass operation shown in FIG. 7B. The e-ray, when incident on birefringent walk-off block 1120, may pass through birefringent walk-off block 1120 with a spatial walk-off as shown in FIG. 11, and thus may be spatially separate from the emitted linearly polarized light from light source 1110. A first reflector 1190 (e.g., a mirror or a reflection prism) and a second reflector 1192 (e.g., a mirror or a reflection prism) may direct the e-ray towards second PBS 1170 through a wave plate 1194, which may be placed such that its fast axis is at 45° to the plane of polarization of the e-ray to convert the e-ray to the o-ray. The o-ray may be reflected by second PBS 1170 towards photodetector 1180. As such, both the o-ray component and the e-ray component of the returned light may be detected by photodetector 1180. Thus, the optical efficiency η of the LiDAR hardware is improved.

It is noted that, even though not shown in the embodiments described above, in various embodiments, one or more reflectors may be added as appropriate in the optical path, to change the propagation direction of the light, without changing the polarization direction of the reflected light. In some embodiments, one or more reciprocal polarization rotators, such as waveplates, may be added as appropriate in the optical path in the embodiments described above, to rotate the polarization direction of linearly polarized light, for example, by 90°.

Figure 12:
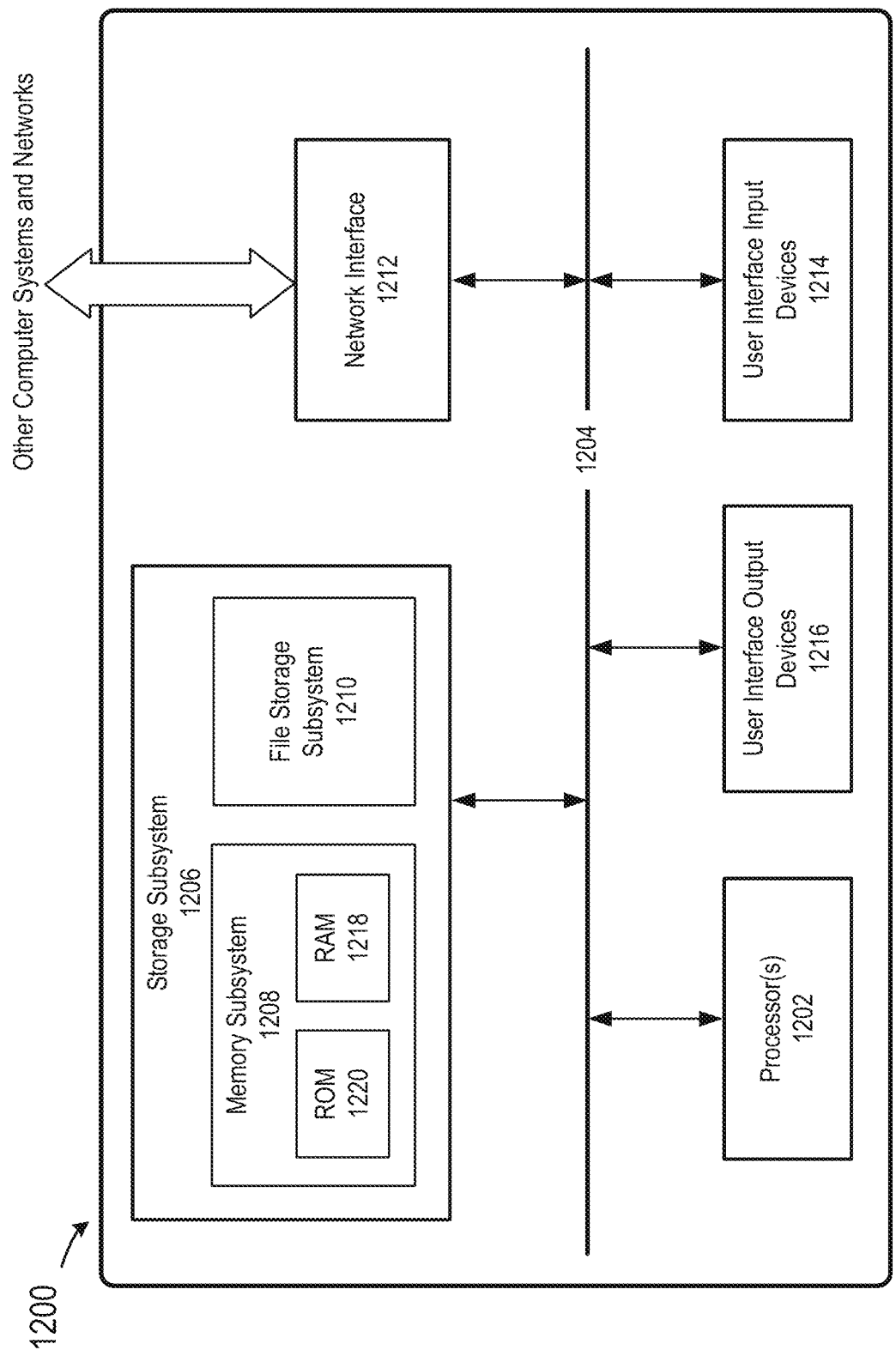
FIG. 12 is a simplified block diagram of an example of a computer system for implementing some techniques disclosed herein according to certain embodiments.

FIG. 12 illustrates an example of a computer system 1200 for implementing some of the embodiments disclosed herein. Computer system 1200 can be used to implement any of the LiDAR systems discussed above. For example, computer system 1200 may be used to implement LiDAR system 102, processor/controller 210, LiDAR controller 306, or other systems, subsystems, units, or components described herein. Computer system 1200 can include one or more processors 1202 that can communicate with a number of peripheral devices (e.g., input devices) via an internal bus subsystem 1204. These peripheral devices can include storage subsystem 1206 (comprising memory subsystem 1208 and file storage subsystem 1210), user interface input devices 1214, user interface output devices 1216, and a network interface subsystem 1212.

In some examples, internal bus subsystem 1204 can provide a mechanism for letting the various components and subsystems of computer system 1200 communicate with each other as intended. Although internal bus subsystem 1204 is shown schematically as a single bus, alternative embodiments of the bus subsystem can utilize multiple buses. Additionally, network interface subsystem 1212 can serve as an interface for communicating data between computer system 1200 and other computer systems or networks. Embodiments of network interface subsystem 1212 can include wired interfaces (e.g., Ethernet, CAN, RS-232, RS-485, etc.) or wireless interfaces (e.g., ZigBee, Wi-Fi, cellular, etc.).

In some cases, user interface input devices 1214 can include a keyboard, pointing devices (e.g., mouse, trackball, touchpad, etc.), a barcode scanner, a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 1200. Additionally, user interface output devices 1216 can include a display subsystem, a printer, or non-visual displays such as audio output devices, etc. The display subsystem can be any known type of display device. In general, use of the term "output device" is intended to include all possible types of devices and mechanisms for outputting information from computer system 1200.

Storage subsystem 1206 can include memory subsystem 1208 and file storage subsystem 1210. Subsystems 1208 and 1210 represent non-transitory computer-readable storage media that can store program code and/or data that provide the functionality of disclosed herein. In some embodiments, memory subsystem 1208 can include a number of memories including main random access memory (RAM) 1218 for storage of instructions and data during program execution and read-only memory (ROM) 1220 in which fixed instructions may be stored. File storage subsystem 1210 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1200 is illustrative and not intended to limit embodiments of the present disclosure. Many other configurations having more or fewer components than computer system 1200 are possible. The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard or non-standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C#or C++, or any scripting language, such as Perl, Python or TCL, as well as combinations thereof. The server(s) may also include database servers, including without limitation those commercially available from Oracle®, Microsoft®, Sybase® and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A coaxial light detection and ranging (LiDAR) system comprising:
a photodetector;
a first polarization beam splitter configured to:
receive a returned light beam including a first linear polarization component and a second linear polarization component; and
direct the first linear polarization component and the second linear polarization component to different respective directions;
a polarization beam combiner configured to transmit the first linear polarization component from the first polarization beam splitter to the photodetector;
a non-reciprocal polarization rotator configured to transmit the second linear polarization component from the first polarization beam splitter; and
a second polarization beam splitter configured to reflect the second linear polarization component from the non-reciprocal polarization rotator towards the polarization beam combiner,
wherein the polarization beam combiner is further configured to reflect the second linear polarization component from the second polarization beam splitter to the photodetector.

2. The coaxial LiDAR system of claim 1, wherein the non-reciprocal polarization rotator comprises:
a Faraday rotator configured to rotate a polarization direction of a linearly polarized light beam by 45°; and
a half-wave plate,
wherein the Faraday rotator and the half-wave plate are arranged such that the non-reciprocal polarization rotator is configured to:
rotate the polarization direction of the linearly polarized light beam propagating in a first direction by 90°; and
rotate the polarization direction of the linearly polarized light beam propagating in a second direction opposite the first direction by 0°.

3. The coaxial LiDAR system of claim 1, further comprising:
a light source configured to emit a linearly polarized scanning beam including the first linear polarization component; and
an optical scanner,
wherein the second polarization beam splitter is further configured to transmit the first linear polarization component of the linearly polarized scanning beam from the light source to the non-reciprocal polarization rotator;
wherein the non-reciprocal polarization rotator is further configured to convert the first linear polarization component of the linearly polarized scanning beam to the second linear polarization component by rotating a polarization direction of the linearly polarized scanning beam by 90°; and
wherein the first polarization beam splitter is further configured to reflect the linearly polarized scanning beam having the second linear polarization component to the optical scanner.

4. The coaxial LiDAR system of claim 1, wherein the first polarization beam splitter, the polarization beam combiner, and the second polarization beam splitter include polarization beam splitter cubes.

5. The coaxial LiDAR system of claim 1, further comprising at least one of a light filter or a lens between the polarization beam combiner and the photodetector.

6. The coaxial LiDAR system of claim 1, further comprising at least one of a mirror or a prism reflector, the at least one of the mirror or the prism reflector configured to direct the second linear polarization component from the non-reciprocal polarization rotator to the polarization beam combiner.

7. The coaxial LiDAR system of claim 1, wherein the photodetector includes at least one of a PIN photodetector, an avalanche photodiode, a single-photon avalanche photodiode, a silicon photomultiplier sensor, a multi-pixel photon counter, or a photomultiplier tube.

8. The coaxial LiDAR system of claim 1, wherein:
the first linear polarization component includes a p-wave; and
the second linear polarization component includes an s-wave.

9. A coaxial light detection and ranging (LiDAR) system comprising:
a photodetector;
a polarization beam splitter configured to:
receive a returned light beam including a first linear polarization component and a second linear polarization component; and
direct the first linear polarization component and the second linear polarization component to different respective directions;
a polarization beam combiner configured to transmit the first linear polarization component from the polarization beam splitter to the photodetector;
a non-reciprocal polarization rotator configured to receive the second linear polarization component from the polarization beam splitter and convert the second linear polarization component to the first linear polarization component;
a birefringent device configured to receive the first linear polarization component from the non-reciprocal polarization rotator and shift the first linear polarization component by a spatial walk-off distance;
one or more reflectors configured to direct the first linear polarization component from the birefringent device towards the polarization beam combiner; and
a polarization rotator configured to convert the first linear polarization component to the second linear polarization component, wherein the polarization rotator is:

between the birefringent device and the one or more reflectors;
between the one or more reflectors; or
between the polarization beam combiner and the one or more reflectors,
wherein the polarization beam combiner is further configured to reflect the second linear polarization component from the polarization rotator to the photodetector.

10. The coaxial LiDAR system of claim 9, wherein the non-reciprocal polarization rotator includes:
a Faraday rotator configured to rotate a polarization direction of a linearly polarized light beam by 45°; and
a half-wave plate,
wherein the Faraday rotator and the half-wave plate are arranged such that the non-reciprocal polarization rotator is configured to:
rotate the polarization direction of the linearly polarized light beam propagating in a first direction by 90°; and
rotate the polarization direction of the linearly polarized light beam propagating in a second direction opposite the first direction by 0°.

11. The coaxial LiDAR system of claim 9, wherein:
the first linear polarization component includes an e-ray; and
the second linear polarization component includes an o-ray.

12. The coaxial LiDAR system of claim 9, further comprising:
a light source configured to emit a linearly polarized scanning beam including the second linear polarization component; and
an optical scanner,
wherein the birefringent device is further configured to transmit, with no spatial walk-off, the second linear polarization component of the linearly polarized scanning beam from the light source to the non-reciprocal polarization rotator;
wherein the non-reciprocal polarization rotator is further configured to transmit the second linear polarization component of the linearly polarized scanning beam from the birefringent device to the polarization beam splitter; and
wherein the polarization beam splitter is further configured to reflect the linearly polarized scanning beam having the second linear polarization component to the optical scanner.

13. The coaxial LiDAR system of claim 9, wherein the polarization beam splitter and the polarization beam combiner include polarization beam splitter cubes.

14. The coaxial LiDAR system of claim 9, further comprising at least one of a light filter or a lens between the polarization beam combiner and the photodetector.

15. The coaxial LiDAR system of claim 9, wherein the one or more reflectors include at least one of a mirror or a prism reflector.

16. A coaxial light detection and ranging (LiDAR) system comprising:
a photodetector;
a first polarization beam splitter configured to:
receive a returned light beam including a first linear polarization component and a second linear polarization component; and
direct the first linear polarization component and the second linear polarization component to different respective directions;
a polarization rotator configured to receive the first linear polarization component from the first polarization beam splitter and convert the first linear polarization component to the second linear polarization component;
a polarization beam combiner configured to transmit the second linear polarization component from the polarization rotator to the photodetector;
a non-reciprocal polarization rotator configured to receive the second linear polarization component from the first polarization beam splitter and convert the second linear polarization component to the first linear polarization component; and
a second polarization beam splitter configured to reflect the first linear polarization component from the non-reciprocal polarization rotator towards the polarization beam combiner,
wherein the polarization beam combiner is further configured to reflect the first linear polarization component from the second polarization beam splitter to the photodetector.

17. The coaxial LiDAR system of claim 16, wherein:
the first linear polarization component includes an s-wave; and
the second linear polarization component includes a p-wave.

18. The coaxial LiDAR system of claim 16, wherein the non-reciprocal polarization rotator includes:
a Faraday rotator configured to rotate a polarization direction of a linearly polarized light beam by 45°; and
a half-wave plate,
wherein the Faraday rotator and the half-wave plate are arranged such that the non-reciprocal polarization rotator is configured to:
rotate the polarization direction of the linearly polarized light beam propagating in a first direction by 90°; and
rotate the polarization direction of the linearly polarized light beam propagating in a second direction opposite the first direction by 0°.

19. The coaxial LiDAR system of claim 16, further comprising:
a light source configured to emit a linearly polarized scanning beam including the second linear polarization component; and
an optical scanner,
wherein the second polarization beam splitter is further configured to transmit the second linear polarization component of the linearly polarized scanning beam from the light source to the non-reciprocal polarization rotator;
wherein the non-reciprocal polarization rotator is further configured to transmit the linearly polarized scanning beam having the second linear polarization component from the second polarization beam splitter to the first polarization beam splitter; and
wherein the first polarization beam splitter is further configured to transmit the linearly polarized scanning beam having the second linear polarization component to the optical scanner.

20. The coaxial LiDAR system of claim 16, wherein the first polarization beam splitter, the polarization beam combiner, and the second polarization beam splitter include polarization beam splitter cubes.

* * * * *